(12) United States Patent
Alon et al.

(10) Patent No.: US 8,509,321 B2
(45) Date of Patent: Aug. 13, 2013

(54) SIMULTANEOUS BI-DIRECTIONAL LINK

(75) Inventors: Elad Alon, Saratoga, CA (US); Sudhakar Pamarti, Los Angeles, CA (US); Fariborz Assaderaghi, Los Altos, CA (US); Kun-Yung Chang, Los Altos, CA (US)

(73) Assignee: Rambus Inc., Sunnyvale, CA (US)

( * ) Notice: Subject to any disclaimer, the term of this patent is extended or adjusted under 35 U.S.C. 154(b) by 2885 days.

(21) Appl. No.: 11/021,514

(22) Filed: Dec. 23, 2004

(65) Prior Publication Data
US 2006/0140287 A1    Jun. 29, 2006

(51) Int. Cl.
*H04K 1/10* (2006.01)
(52) U.S. Cl.
USPC ............ 375/260; 375/267; 375/290; 375/295
(58) Field of Classification Search
USPC ...... 375/260, 219, 295, 267, 290; 455/186.1, 455/480, 103; 370/465, 485
See application file for complete search history.

(56) References Cited

U.S. PATENT DOCUMENTS

| | | | |
|---|---|---|---|
| 5,235,612 A | 8/1993 | Stilwell et al. | 375/1 |
| 5,377,183 A | 12/1994 | Dent | 370/18 |
| 5,471,464 A | 11/1995 | Ikeda | 370/19 |
| 5,640,423 A | 6/1997 | Archer | 375/261 |
| 5,675,572 A | 10/1997 | Hidejima et al. | 370/206 |
| 5,717,619 A | 2/1998 | Spurbeck et al. | 364/724.16 |
| 5,805,567 A | 9/1998 | Ramesh | 370/204 |
| 5,852,630 A | 12/1998 | Langberg et al. | 375/219 |
| 5,881,107 A | 3/1999 | Termerinac et al. | 375/279 |
| 5,909,463 A | 6/1999 | Johnson et al. | 375/22 |
| 6,028,891 A | 2/2000 | Ribner et al. | 375/222 |
| 6,169,768 B1 | 1/2001 | Okada et al. | 375/316 |
| 6,295,272 B1 * | 9/2001 | Feldman et al. | 370/210 |
| 6,310,910 B1 | 10/2001 | Shah et al. | 375/222 |
| 6,356,555 B1 | 3/2002 | Rakib et al. | 370/441 |
| 6,373,827 B1 | 4/2002 | Tayebi et al. | 370/310 |

(Continued)

FOREIGN PATENT DOCUMENTS

| | | |
|---|---|---|
| EP | 0613266 A2 | 8/1994 |
| GB | 2271693 A | 4/1994 |
| WO | WO 01/29991 A2 | 4/2001 |
| WO | WO 02/28045 A1 | 4/2002 |

OTHER PUBLICATIONS

J. Kim, et al., "A 2-Gb/s/pin Source Synchronous CDMA Bus Interface with Simultaneous Multi-chip Access and Reconfigurable I/O Capability," Proceedings of the IEEE 2003 Custom Integrated Circuits Conference, Sep. 21-24, 2003, pp. 317-320.

(Continued)

*Primary Examiner* — Kabir A Timory
(74) *Attorney, Agent, or Firm* — Morgan, Lewis & Bockius LLP

(57) ABSTRACT

A memory system with a simultaneous bi-directional link includes a controller, a memory device and a set of signal lines coupled to the controller and the memory device. Simultaneous communication between the controller and the memory device on the set of signal lines uses a first band of frequencies, and between the memory device and the controller on the set of signal lines uses a second band of frequencies. The controller is configured to dynamically adjust the first band of frequencies based on a predetermined data rate between the controller and the memory device and to dynamically adjust the second band of frequencies based on a predetermined data rate between the memory device and the controller.

37 Claims, 21 Drawing Sheets

(56) References Cited

U.S. PATENT DOCUMENTS

| | | | |
|---|---|---|---|
| 6,408,022 B1 | 6/2002 | Fertner | 375/230 |
| 6,442,195 B1* | 8/2002 | Liu et al. | 375/220 |
| 6,549,566 B1 | 4/2003 | Lee et al. | 375/219 |
| 6,553,398 B2 | 4/2003 | Capofreddi | 708/319 |
| 6,665,349 B1 | 12/2003 | Cherubini et al. | 375/261 |
| 6,687,291 B1 | 2/2004 | Lee et al. | 375/229 |
| 6,778,102 B1 | 8/2004 | Grunnet-Jepsen et al. | 341/50 |
| 6,816,097 B2 | 11/2004 | Brooks et al. | 341/143 |
| 6,856,590 B2 | 2/2005 | Okada et al. | 370/208 |
| 7,016,739 B2 | 3/2006 | Bange et al. | 607/60 |
| 7,027,536 B1 | 4/2006 | Al-Dhahir | 375/347 |
| 7,243,254 B1* | 7/2007 | Kuroodi et al. | 713/600 |
| 7,280,612 B2 | 10/2007 | Saed | 375/296 |
| 2002/0023115 A1 | 2/2002 | Kanasugi et al. | 708/313 |
| 2002/0027950 A1 | 3/2002 | Matthews | 375/222 |
| 2002/0105901 A1 | 8/2002 | Chini et al. | 370/206 |
| 2002/0176510 A1 | 11/2002 | Laroia | 375/267 |
| 2003/0058955 A1 | 3/2003 | Raghavan et al. | 375/265 |
| 2003/0063686 A1 | 4/2003 | Giardina et al. | 375/296 |
| 2003/0063759 A1 | 4/2003 | Brennan et al. | 381/92 |
| 2003/0081693 A1 | 5/2003 | Raghavan et al. | 375/298 |
| 2003/0087634 A1 | 5/2003 | Raghavan et al. | 455/423 |
| 2003/0094979 A1* | 5/2003 | Taylor | 327/108 |
| 2003/0112896 A1 | 6/2003 | Raghavan et al. | 375/322 |
| 2003/0133049 A1 | 7/2003 | Cowley et al. | 348/731 |
| 2003/0134607 A1 | 7/2003 | Raghavan et al. | 455/132 |
| 2003/0236071 A1 | 12/2003 | Ito | 455/59 |
| 2004/0071205 A1 | 4/2004 | Gorecki | 375/232 |
| 2004/0110519 A1 | 6/2004 | Chang et al. | 455/502 |
| 2004/0165670 A1 | 8/2004 | Roy et al. | 375/259 |
| 2005/0052304 A1 | 3/2005 | Trotter et al. | 341/152 |
| 2005/0245199 A1 | 11/2005 | Batra et al. | 455/73 |
| 2006/0018344 A1 | 1/2006 | Pamarti | 370/480 |
| 2006/0133538 A1* | 6/2006 | Stojanovic et al. | 375/308 |
| 2007/0081376 A1* | 4/2007 | Funaba et al. | 365/63 |

OTHER PUBLICATIONS

Z. Xu, et al., "A 2.7 Gb/s CDMA-interconnect Transceiver Chip Set with Multi-level Signal Data Recovery for Reconfigurable VLSI Systems," Digest of Technical Papers: International Solid-State Circuits Conference, San Francisco CA, USA, Feb. 9-13, 2003, vol. 1, 2003, pp. 82-83.

Amirkhany, Amir, et al., "Multi-tone Signaling for High-speed Backplane Electrical Links," Feb. 29, 2004.

Bingham, J.A.C. "Multicarrier Modulation for Data Transmission: An Idea Whose Time Has Time," IEEE Communications Magazine, vol. 28, No. 5, May 1, 1990, pp. 5-8, 11.

International Search Report for International Application No. PCT/US2005/038707 mailed Mar. 3, 2006. 5 pages.

U.S. Office Action with mail date of Oct. 29, 2009, re U.S. Appl. No. 11/022,468, filed Dec. 22, 2004. 19 pages.

Response submitted Feb. 1, 2010 to the Office Action dated Oct. 29, 2009 re U.S. Appl. No. 11/033,468. 23 Pages.

Notice of Allowance and Fee(s) Due with mail date of Jun. 14, 2010 re U.S. Appl. No. 11/022,468. 10 Pages.

Response submitted Feb. 1, 2010 to the Office Action dated Oct. 29, 2009 re U.S. Appl. No. 11/022,468. 23 pages.

* cited by examiner

SIMULTANEOUS BI-DIRECTIONAL LINK

FIELD OF THE INVENTION

The present invention relates generally to the communication of data.

BACKGROUND

Low bit-error-rate communication of data over a communications channel is often considered an important requirement in communications and computation systems. Fulfilling this requirement is increasingly difficult in systems with data rates exceeding multiple gigabits per second ("Gbits/s" or "Gbps"). In the case of an interface or interconnect, either between or within semiconductor chips (also known as dies) that are configured for simultaneous bi-directional communication, there is a problem associated with resource allocation. In a contemporary simultaneous bi-directional communication link, each direction is allocated an equal, fixed bandwidth. In applications such as application specific integrated circuits (ASICs) and memory systems, a required bandwidth in a respective direction on a link is usually unknown a priori and may vary as a function of time. In addition, such a fixed and equal bandwidth allocation may necessitate equal circuit complexity on both sides of the link.

In a simultaneous bi-directional link, the two directions also share a common band of frequencies. This poses an additional challenge of cross-talk between signals on the link.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF EMBODIMENTS

Figure 1:
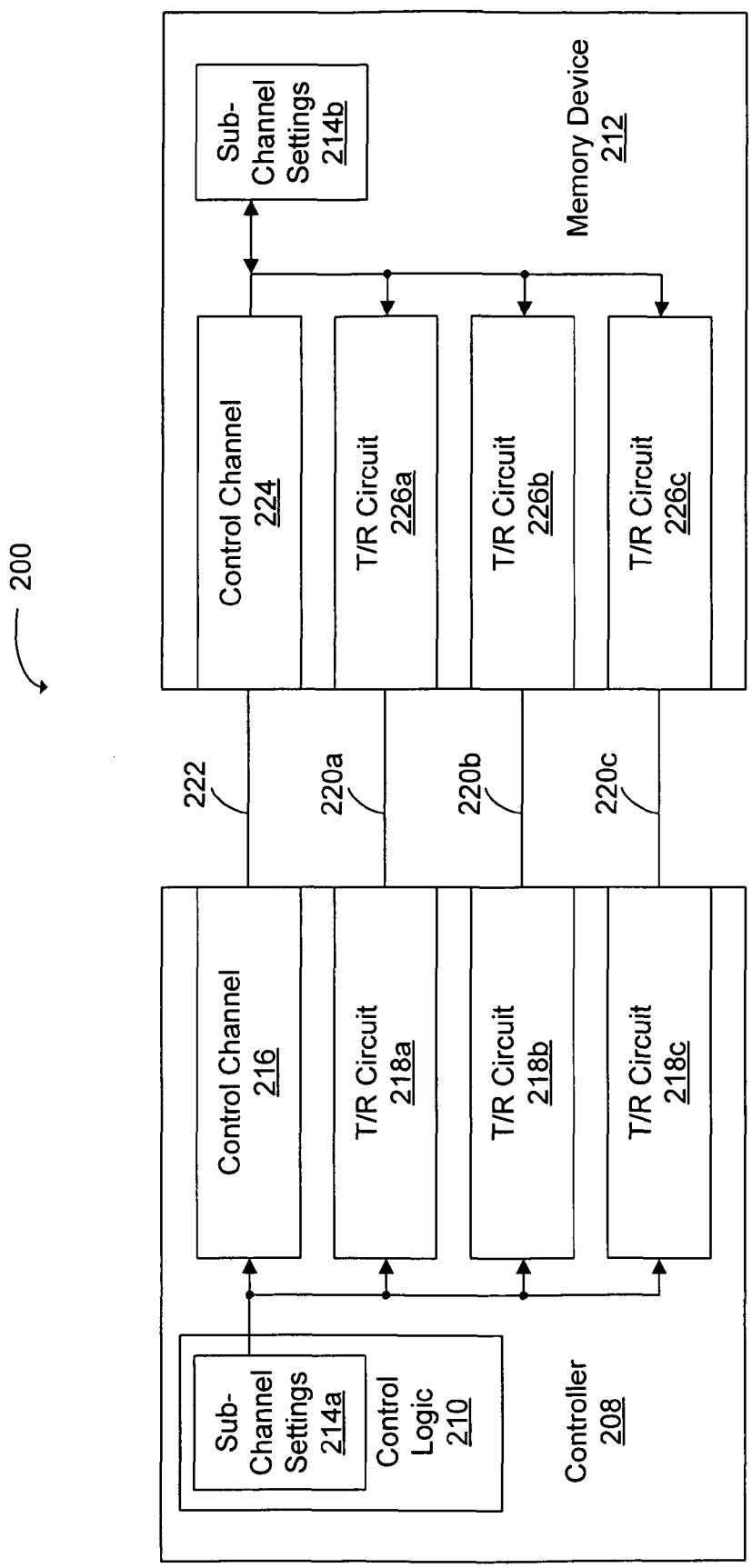
FIG. 1 is a block diagram illustrating an embodiment of a memory system with a simultaneous bi-directional link.

A communication system having a simultaneous bi-directional link for simultaneous communication between a controller and a memory device is described. The bi-directional link has two or more bands of frequencies that may be dynamically adjusted and/or allocated to achieve a predetermined unidirectional or bi-directional data rate. The bi-directional link may use multi-tone communication with orthogonal or approximately orthogonal bands of frequencies. The bi-directional link may also use one or more modulation codes. The modulation codes used may be dynamically selected based on the predetermined unidirectional or bi-directional data rate.

In an embodiment of a communication system having the simultaneous bi-directional link, a memory system includes the controller, the memory device and a set of signal lines coupled to the controller and the memory device. Simultaneous communication between the controller and the memory device on the set of signal lines uses a first band of frequencies and simultaneous communication between the memory device and the controller on the set of signal lines uses a second band of frequencies. The controller is configured to dynamically adjust the first band of frequencies based on a predetermined data rate between the controller and the memory device and to dynamically adjust the second band of frequencies based on a predetermined data rate between the memory device and the controller.

In some embodiments, the memory system has one mode of operation in which the set of signal lines uses multi-tone communication over a plurality of sub-channels including, for example, a baseband sub-channel and a passband sub-channel. The controller and/or the memory device is configured to transmit a data stream in the plurality of sub-channels including, for example, the baseband sub-channel and the passband sub-channel. A respective sub-channel communicates a subset of the data stream. Each subset of the data stream has a symbol rate less than a symbol rate of the data stream. In some embodiments, the baseband sub-channel corresponds to the first band of frequencies and the passband sub-channel to the second band of frequencies.

In some embodiments, the controller includes control logic to dynamically adjust the first band of frequencies and the second band of frequencies based on the predetermined data rate between the controller and the memory device and the predetermined data rate between the memory device and the controller. In some embodiments, the controller is configured to dynamically adjust at least one circuit in the controller and the memory device so as to adjust the first band of frequencies and the second band of frequencies.

In some embodiments, where the set of signal lines uses multi-tone communication over N sub-channels, the controller determines how many of the N sub-channels are used for communication between the controller and the memory device and how many of the N sub-channels are used for communication between the memory device and the controller.

In some embodiments, the plurality of sub-channels are orthogonal frequency bands. A respective frequency band corresponding to the passband sub-channel is defined in part by a respective sinusoidal signal that frequency shifts signals into a range of frequencies corresponding to the passband sub-channel.

In other embodiments, the plurality of sub-channels are approximately orthogonal frequency bands. A respective frequency band corresponding to the passband sub-channel is defined in part by a respective vector that frequency shifts signals into a range of frequencies corresponding to the passband sub-channel. The respective vector corresponds to a respective sequence of N elements and is substantially orthogonal to respective vectors used to define other sub-bands during a finite time interval corresponding to each sequence of N elements. In some embodiments, the respective sequence corresponds to a row of a Hadamard matrix of order N. In some embodiments, receive circuits in the controller and/or the memory device include an integrator. The integrator integrates signals in the respective sub-channel for substantially the finite time interval.

In some embodiments, signals in the baseband sub-channel are modulated using a first modulation code and signals in the passband sub-channel are modulated using a second modulation code. The first modulation code and the second modulation code are, for example, quadrature amplitude modulation ("QAM") codes and/or a multiple level pulse amplitude modulation codes. Specific examples of codes include two-level pulse amplitude modulation (2-PAM), four-level pulse amplitude modulation (4-PAM), eight-level pulse amplitude modulation (8-PAM), sixteen-level pulse amplitude modulation (16-PAM), two-level on-off keying (2-OOK), four-level pulse on-off keying (4-OOK), eight-level on-off keying (8-OOK) and/or sixteen-level on-off keying (16-OOK).

In some embodiments, the memory system further includes a control channel for communicating to the memory device adjustments to the plurality of sub-channels.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Figure 2:
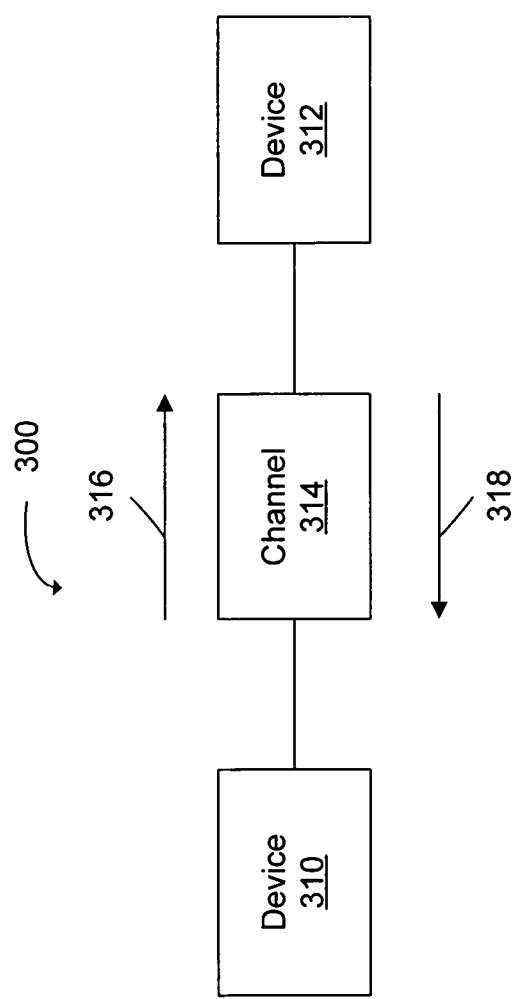
FIG. 2 is a block diagram illustrating an embodiment of a memory system with a simultaneous bidirectional link.

FIG. 2 illustrates an embodiment of a memory system 300 having a simultaneous bi-directional link. A first device 310 communicates with a second device 312 using communication channel 314. During such communication, the first device 310 transmits data in direction 316. The second device 312 simultaneously communicates with the first device 310 using the communication channel 314. During such communication, the second device 312 transmits data in direction 318. This simultaneous communication of data in direction 316 and direction 318 between the first device 310 and the second device 312 defines the simultaneous bi-directional link.

In some embodiments, the memory system 300 corresponds to inter-chip communication, such as between one or more semiconductor chips or dies. In other embodiments, the memory system 300 corresponds to communication within a semiconductor chip, also known as intra-chip communication, such as between modules in an integrated circuit.

FIG. 1 illustrates an embodiment of a memory system 200 having a plurality of simultaneous bi-directional links. A controller 208 is coupled to a memory device 212 via a set of signal lines 220 that together constitute a channel, such as communication channel 314 (FIG. 2). In some embodiments, a length of signal lines 220 is less than 1 meter. In some embodiments, the signal lines 220 may correspond to an interconnect or an interface. In some embodiments, the signal lines 220 may correspond to a back plane. The controller 208 has a plurality of data transmission and/or receiving circuits 218, henceforth denoted by data transmission/receiving circuits 218, for transmitting and receiving data to and from the memory device 212. The memory device 212 also has a plurality of data transmission and/or receiving communication circuits 226, henceforth denoted by data transmission/receiving circuits 226, for simultaneously transmitting and receiving data to and from the controller 208.

Figure 3:
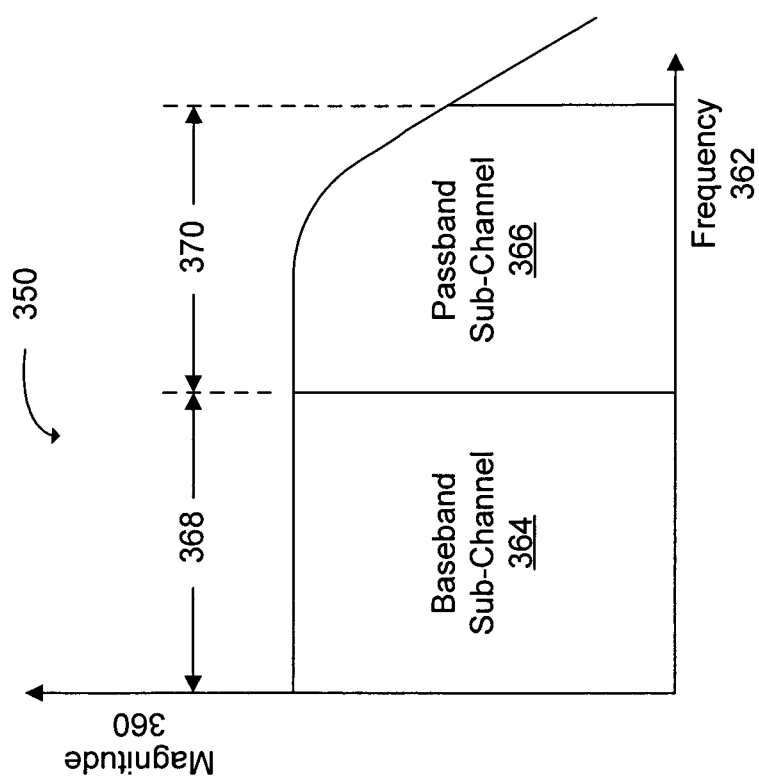
FIG. 3 is a frequency usage diagram illustrating frequency bands of two sub-channels in an embodiment of a memory system.

In some embodiments, each data transmission/receiving circuit, such as data transmission/receiving circuit 218a, has a respective baseband circuit, corresponding to a baseband sub-channel (such as baseband sub-channel 364 in FIG. 3) in the set of signal lines 220, and one or more respective passband circuits, corresponding to one or more passband sub-channels (such as passband sub-channel 366 in FIG. 3) in the set of signal lines 220. FIG. 3 illustrates a spectrum 350, including magnitude 360 as a function of frequency 362, for a bi-directional link of a memory system, such as the memory system 200 (FIG. 1). A first band of frequencies 368 corresponds to the baseband sub-channel 364. A second band of frequencies 370 corresponds to the passband sub-channel 366. In some embodiments, such as those where the communications channel 314 (FIG. 2) is ac-coupled, the baseband sub-channel 364 does not contain DC (i.e., does not include 0 Hz).

Referring back to FIG. 1, in some embodiments the controller 208 transmits data to the memory device 212 using the second band of frequencies 370 (FIG. 3), i.e., the passband sub-channel 366 (FIG. 3), and the memory device 212 transmits data to the controller 208 using the first band of frequencies 368 (FIG. 3), i.e., the baseband sub-channel 364 (FIG. 3). Data transmission and receipt are accomplished using one or more of the data transmission/receiving circuits 218 and 226. These embodiments may be used in memory systems 200 that tend to include more read data traffic from the memory device 212 than write data traffic to the memory device 212.

The controller 208 includes control logic 210. Control logic 210 is configured to dynamically allocate or adjust one or more bands of frequencies, such as the first band of frequencies 368 (FIG. 3) and/or the second band of frequencies 370 (FIG. 3), based on the predetermined data rate between the controller 208 and the memory device 212 and the predetermined data rate between the memory device 212 and the controller 208. The control logic 210 adjusts a respective band of frequencies by adjusting one or more circuit parameters in one or more of the data transmission/receiving circuits 218 and 224. In some embodiments, sub-channel settings are stored in an optional memory 214a. In some embodiments, optional memory 214a is contained within the control logic 210.

In some embodiments, the predetermined data rate between the controller 208 and the memory device 212 is greater than 1 Gbps. In some embodiments, the predetermined data rate between the controller 208 and the memory device 212 is greater than 2 Gbps. In some embodiments, the predetermined data rate between the controller 208 and the memory device 212 is greater than 5 Gbps. In some embodiments, the predetermined data rate between the controller 208 and the memory device 212 is greater than 10 Gbps. In some embodiments, the predetermined data rate between the memory device 212 and the controller 208 is greater than 1 Gbps. In some embodiments, the predetermined data rate between the memory device 212 and the controller 208 is greater than 2 Gbps. In some embodiments, the predetermined data rate between the memory device 212 and the controller 208 is greater than 5 Gbps. In some embodiments, the predetermined data rate between the memory device 212 and the controller 208 is greater than 10 Gbps.

The memory system 200 may have a mode of operation in which the control logic 210 allocates a substantially zero band of frequencies to the first band of frequencies 368 (FIG. 3) and a maximum band of frequencies to the second band of frequencies 370 (FIG. 3) in one or more of the data transmission/receiving circuits 218 and 226 in order to transfer data from the controller 208 to the memory device 212 at a maximum rate. The memory system 200 may also have a mode of operation in which the control logic 210 allocates a substantially zero band of frequencies to the second band of frequencies 370 (FIG. 3) and a maximum band of frequencies to the first band of frequencies 368 (FIG. 3) in one or more of the data transmission/receiving circuits 218 and 224 in order to transfer data from the memory device 212 to the controller 208 at a maximum rate.

In some embodiments, the baseband sub-channel 364 (FIG. 3) is used to transmit data between memory device 212 and the controller 208 or between the controller 208 and the memory device 212 in one or more data transmission/receiving circuits 218 and 226. In some embodiments, the passband sub-channel 366 (FIG. 3) is used to transmit data between the controller 208 and the memory device 212 or between the memory device 212 and the controller 208 in one or more of the data transmission/receiving circuits 218 and 226. The control logic 210 dynamically allocates the baseband sub-channel 364 (FIG. 3) and/or the passband sub-channel 366 (FIG. 3) to the respective data transmission direction based on the predetermined data rate between the controller 208 and the memory device 212 and/or the memory device 212 and the controller 208. More generally, in an embodiment having N sub-channels (including the baseband sub-channel 364 in FIG. 3 and one or more passband sub-channels 366 in FIG. 3), the control logic 210 determines how many of the N sub-channels are used for data transmission between the controller 208 and the memory device 212 and how many of the N sub-channels are used for data transmission between the memory device 212 and the controller 208 in one or more of the data transmission/receiving circuits 218 and 226. Sub-channel allocation is based on a predetermined unidirectional data rate.

In some embodiments, the memory system 200 may include a control channel, including control channel circuit 216, control channel circuit 224 and signal line 222. In some embodiments, the control channel communicates information from the controller 208 to the memory device 212 corresponding to one or more sub-channel settings for one or more of the data transmission/receiving circuits 226, such as data transmission/receiving circuit 226a. In other embodiments, the information may include data used to train at least one of the data transmission/receiving circuits 226 during a training mode of operation.

In some embodiments, the sub-channel settings are stored in a memory 214b in the memory device 212. In the memory system 200, the control channel is illustrated as having the signal line 222. In some embodiments, the control channel may include two or more signal lines. In some embodiments, each pairing of the data transmission/receiving circuits 218 and 226 in the controller 208 and the memory device 212, such as data transmission/receiving circuit 218a and data transmission/receiving circuit 226a, may have a separate additional signal line in the control channel for communicating respective sub-channel circuit settings. In other embodiments, sub-channel circuit settings and/or data used to train at least of the one data transmission/receiving circuits 226 may be communicated using one or more of the signal lines 220. For example, the sub-channel circuit settings may be transmitted from the controller 208 at a slow data rate that is easily received by the memory device 212.

The memory system 200 in FIG. 1 shows three data transmission/receiving circuits 218 and three data transmission/receiving circuits 226. In other embodiments, the memory system 200 may have one, two or more than three data transmission/receiving circuits 218 and/or data transmission/receiving circuits 226.

Figure 4A:
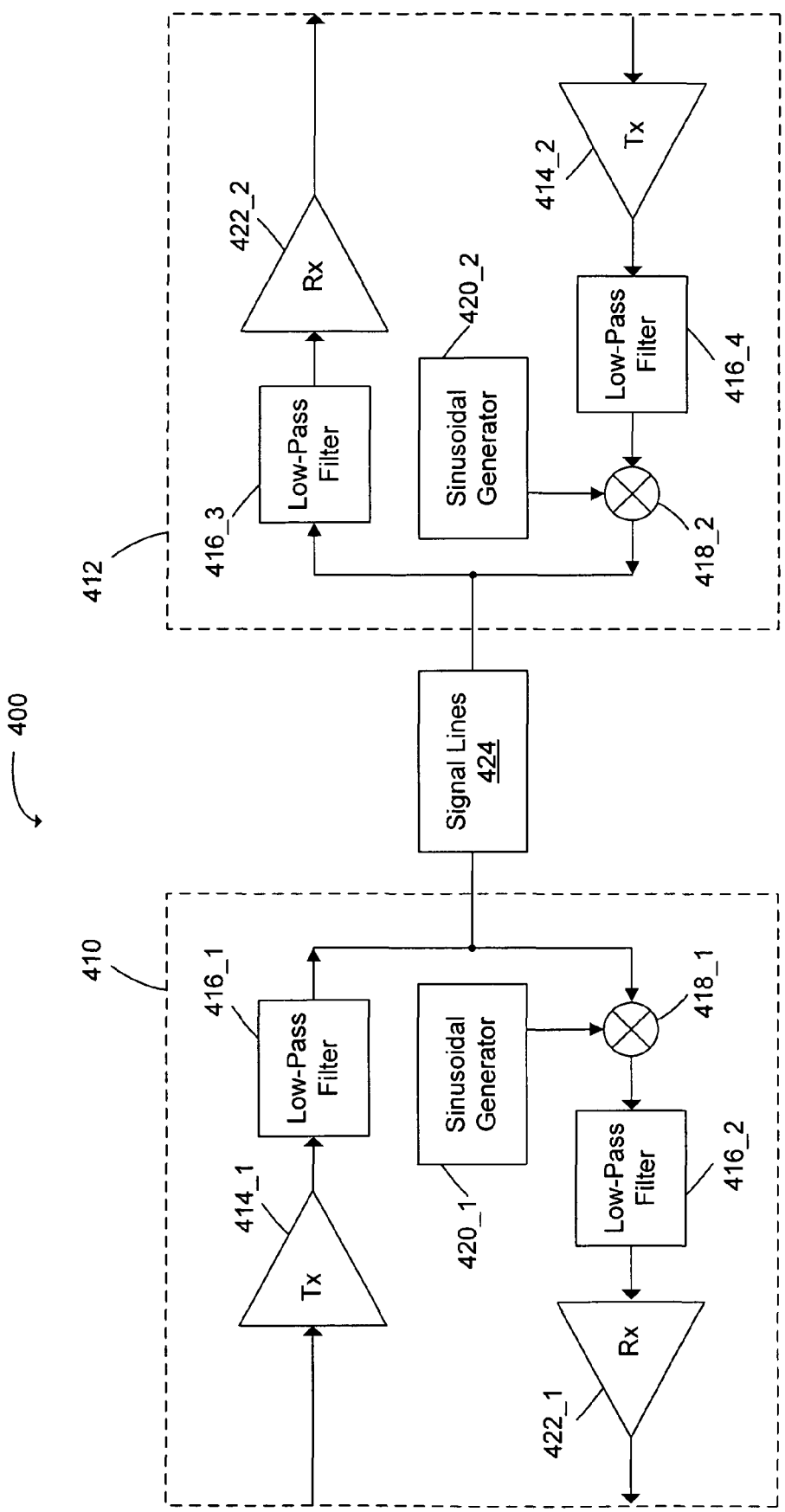
FIG. 4a is a block diagram illustrating an embodiment of a memory system with a simultaneous bi-directional link.

The simultaneous bi-directional link may also be used to implement asymmetrical hardware configurations on the two sides of the signal lines 220 (FIG. 1). In some embodiments, such asymmetrical configurations may be defined dynamically using the control logic 210 (FIG. 1). FIGS. 4-7 illustrate several embodiments of such asymmetrical configurations. In FIG. 4a, a memory system 400 has a first device 410 and a second device 412 that are coupled by a set of signal lines 424. In some embodiments, the set of signal lines 424 may include one or more signal lines. The first device 410 may be one of the data transmission/receiving circuits 226 in the memory device 212 (FIG. 1) and the second device 412 may be one of the data transmission/receiving circuits 218 in the controller 208 (FIG. 1).

Data transmitted from the first device 410 to the second device 412 passes through a transmit buffer 414_1 and a low-pass filter 416_1. This corresponds to the baseband sub-channel 364 (FIG. 3). Data transmitted from the second device 412 to the first device 410 passes through a transmit buffer 414_2, a low pass filter $416_{\_4}$ and is modulated in mixer $418_{\_2}$ with a sinusoidal carrier signal having a respective carrier frequency. The sinusoidal carrier signal is generated by signal generator $420_{\_2}$. The sinusoidal carrier signal, also known as a harmonic signal, may be a sine, a cosine or have a phase in between a sine and a cosine. In some embodiments, the mixer 418_2 is a multiplier. In other embodiments, the signal generator 420_2 may generate a square-wave signal having a fundamental frequency. The modulation shifts data signals to be transmitted to the second band of frequencies 370 (FIG. 3) corresponding to the passband sub-channel 366 (FIG. 3). In some embodiments, data signals to be transmitted are passed through an optional bandpass filter (not shown) prior to transmission to reduce inter-channel interference.

Data signals received from the first device 410 passes through a low-pass filter $416_{\_3}$ and a receive buffer $422_{\_2}$, where the data signals are sampled and quantized (analog-to-digital conversion) using a clock signal (not shown). Data received from the second device 412 is demodulated in mixer 418_1 with a sinusoidal carrier signal having the respective carrier frequency. The sinusoidal carrier signal is generated by signal generator 420_1. In some embodiments, the mixer 418_1 is a multiplier. In other embodiments, the signal generator 420_1 may generate the square-wave signal having the fundamental frequency. The demodulation shifts the received data signals back down in frequency. The data signals then pass through receive buffer 422_1 where the data signals are sampled and quantized. When the memory system 400, as well as the other embodiments of the simultaneous bi-directional link, is operating properly, the received data are substantially similar, and preferably substantially identical, to the transmitted data.

In some embodiments, the received data signals are passed through an optional bandpass filter (not shown) prior to demodulation. In some embodiments, the received data signals are integrated in an integrator (not shown) prior to the receive buffer 422, or the receive buffer 422 may include an integrator. Note that in some embodiments, the first device 410 and the second device 412 may include additional circuitry corresponding to additional passband sub-channels operating in additional frequency ranges. Further, in some embodiments, two data signals may be transmitted in quadrature with each other through the same passband sub-channel.

Figure 4B:
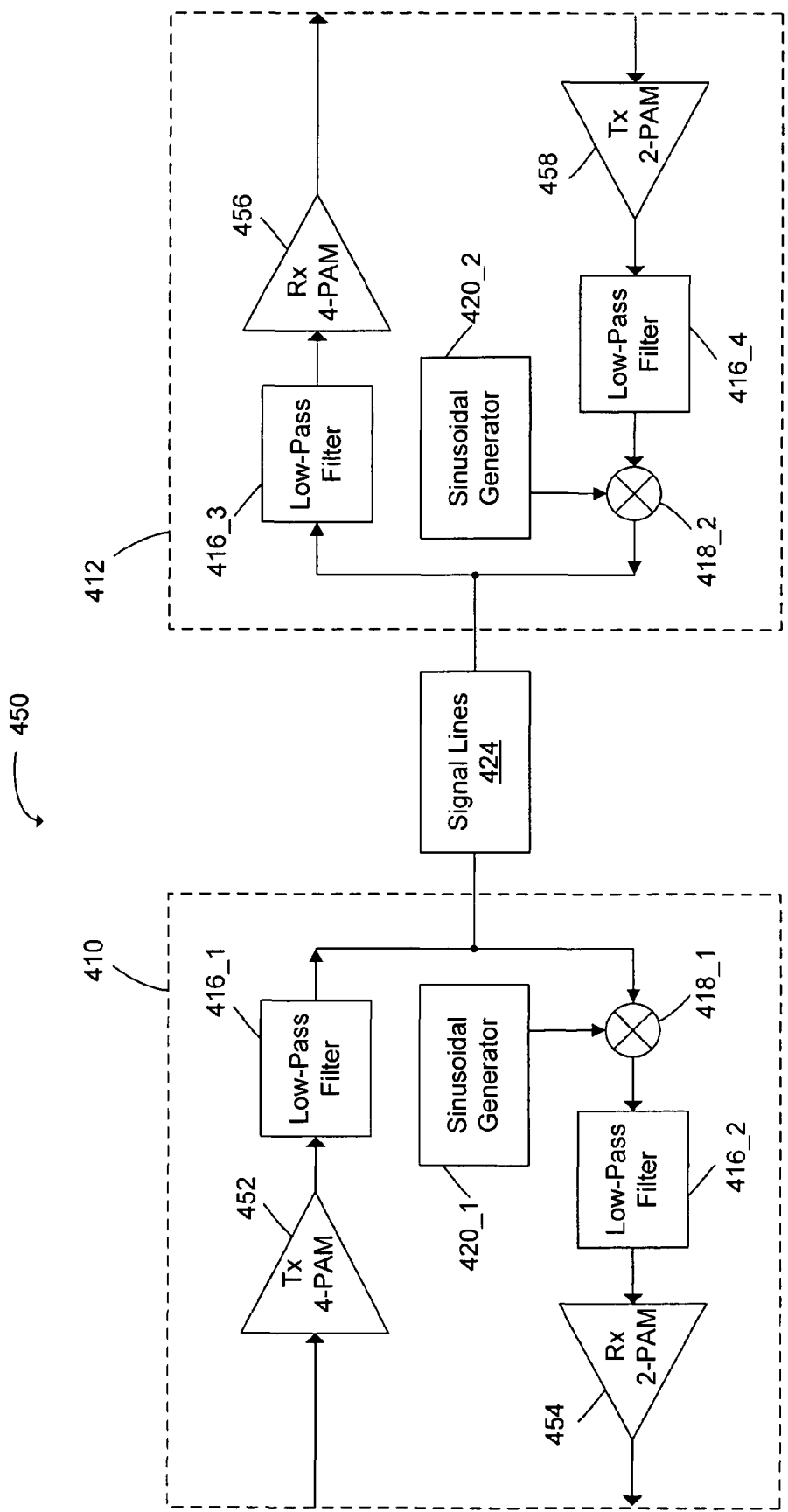
FIG. 4b is a block diagram illustrating an embodiment of a memory system with a simultaneous bi-directional link.

FIG. 4b illustrates an alternate asymmetric embodiment 450 of the memory system 400. The memory system 400 includes the use of bit-to-symbol coding and symbol-to-bit coding. A transmit buffer 452 and a receive buffer 456 use four-level pulse amplitude modulation (4-PAM) for the baseband sub-channel 364 (FIG. 3). A transmit buffer 458 and a receive buffer 454 use two-level pulse amplitude modulation (2-PAM), also referred to as two-level on-off keying (2-OOK), for the passband sub-channel 366 (FIG. 3). As described further below, the various embodiments may use these or other modulation codes in bi-directional simultaneous communication. The modulation codes may be dynamically selected based on the predetermined unidirectional or bi-directional data rate. Alternatively, an asymmetric configuration such as that illustrated in FIG. 4b may be fixed.

Referring back to FIG. 3, the frequencies bands corresponding to the baseband 364 and the passband 366 in the memory system 400 (FIG. 4a) are orthogonal. In the memory system 500 illustrated in FIG. 5, this is not necessarily the case. Once again, a first device 510 communicates with a second device 512. Modulation and demodulation in the memory system 500, however, use a vector signal produced by vector generator 514. The vector signal corresponds to a respective sequence of N elements. Each respective vector signal is orthogonal to respective vector signals used to define other sub-channels during a finite time interval corresponding to each respective sequence of N elements. In an exemplary embodiment, each of the respective sequences corresponds to a row of a Hadamard matrix of order N, where the number of elements N in a row is an even integer. Integrator 516_1 integrates the respective receive data signals for a length of time (also known as an integration period) corresponding to the finite time interval.

Note that in some embodiments, low-pass filters 416_2 and 416_4 are included in the memory system 500. In some embodiments, the received data signals are passed through an optional bandpass filter (not shown) prior to demodulation. Also note that in some embodiments, the first device 510 and the second device 512 may include additional circuitry corresponding to additional passband sub-channels. Further, in some embodiments, two data signals may be transmitted in quadrature with each other through the same passband sub-channel.

Figure 5:
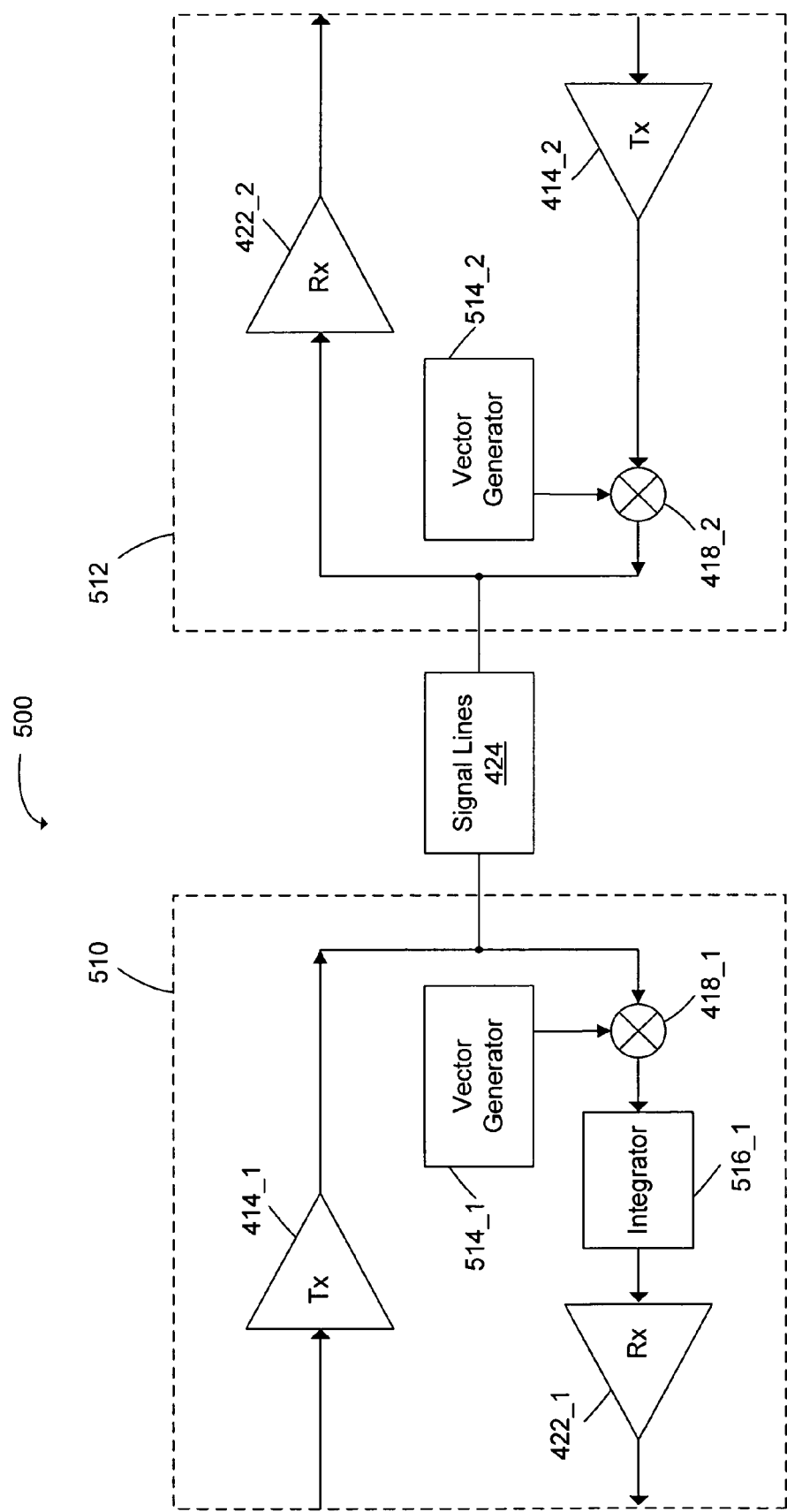
FIG. 5 is a block diagram illustrating an embodiment of a memory system with a simultaneous bi-directional link.
Figure 11:
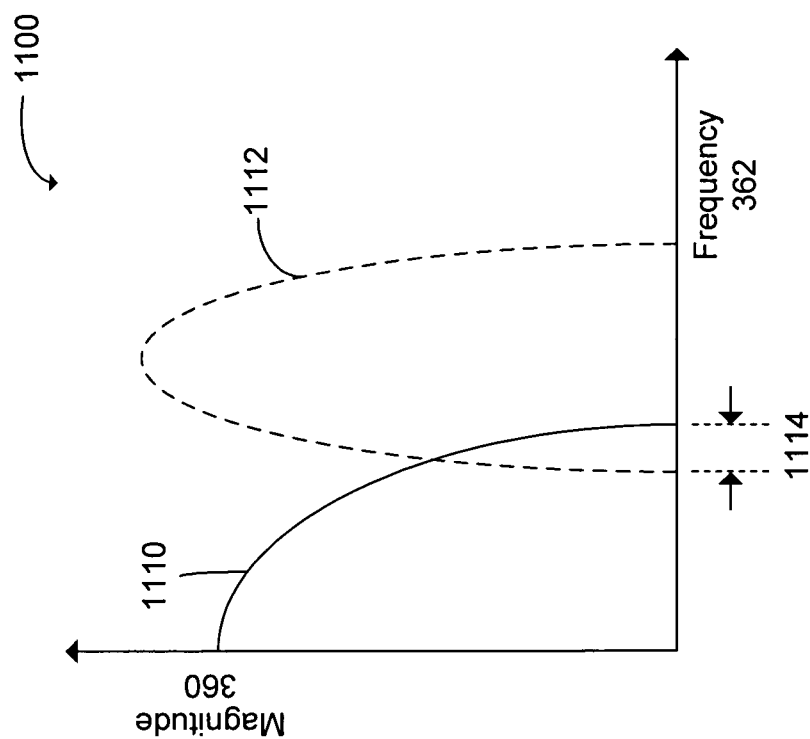
FIG. 11 is a schematic diagram illustrating the spectrum of overlapping frequency bands in an embodiment of the simultaneous bi-directional link.

The characteristics of the respective vectors as well as the optional low-pass and/or bandpass filters (not shown) in the memory system 500 results in substantial overlap of the frequency bands in the spectrum. This is illustrated in FIG. 11, which shows a spectrum 1100 corresponding to the respective sub-channel signals. There is an overlap 1114 of a first frequency band 1110 and a second frequency band 1112. The orthogonality of the respective vector signals, however, ensures that respective sub-channel signals can be extracted from combined signals received on the signal lines 424 (FIG. 5) in the memory system 500 (FIG. 5). Memory systems, such as the memory system 500, that allow substantial overlap of one or more frequency bands use a communication technique that is henceforth referred to as approximate bit-loading.

In general, the spectrum 1100 corresponding to one of the respective sub-channel signals may contain a group of frequency bands. In the context of some of the embodiments of the bi-directional simultaneous link, substantial overlap 1114 exists for at least two of those frequency bands, corresponding to two of the respective sub-channel signals. A substantial overlap is defined to mean that the amount of power in the first frequency band 1110 that overlaps the second frequency band 1112 is greater than 5 percent, and in many implementations is greater than or equal to 10 percent. The amount of overlap 1114, if any, depends on the implementation, the frequency selectivity of the channel, such as communication channel 314 (FIG. 2), and the data rate.

Figure 6:
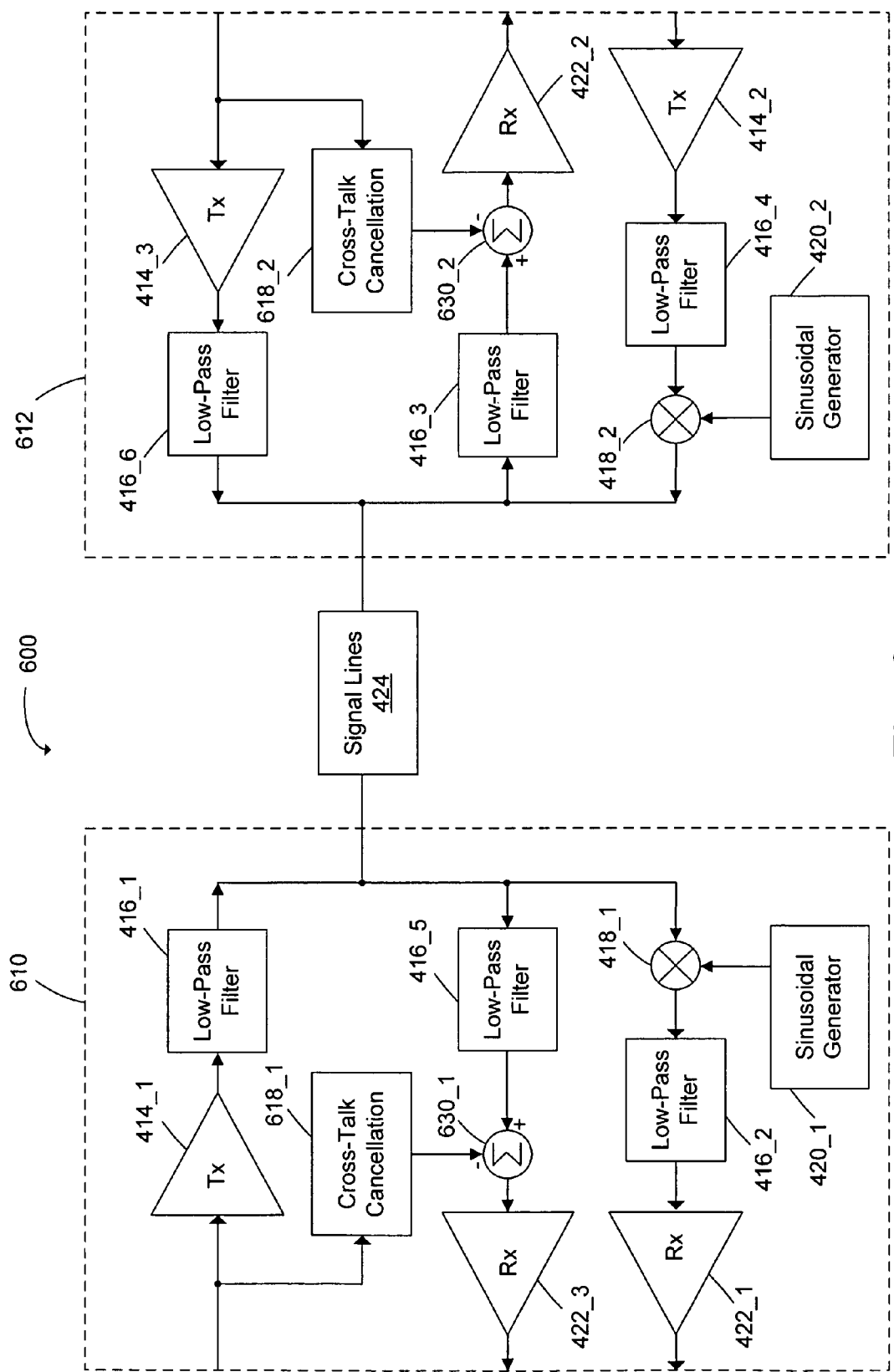
FIG. 6 is a block diagram illustrating an embodiment of a memory system with a simultaneous bi-directional link.

FIG. 6 illustrates an additional embodiment of the simultaneous bi-directional link for communication between a first device 610 and a second device 612. System 600 includes an additional baseband circuit in the first device 610, including low-pass filter 416_5 and receive buffer 422_3, and an additional baseband circuit in the second device 612, including transmit buffer 414_3 and low-pass filter 416_6. Cross-talk cancellation 618 subtracts a signal corresponding to a transmitted data signal using a summing or other combining circuit 630. The first device 610, therefore, transmits data to the second device 612 using the baseband sub-channel 364 (FIG. 3) and receives data from the second device 612 using the baseband sub-channel 364 (FIG. 3) and the passband sub-channel 366 (FIG. 3). Simultaneous transmission and receiving in the baseband sub-channel 364 (FIG. 3) is feasible if there is a sufficient signal-to-noise ratio during communication using the set of signal lines 424. In some embodiments, the memory system 600 may include bandpass filters (not shown) in the passband circuits. In some embodiments, the received data signals are integrated in an integrator (not shown) prior to the receive buffer 422. In some embodiments, the first device 610 and the second device 612 may include additional circuitry corresponding to additional passband sub-channels. Further, in some embodiments, two data signals may be transmitted in quadrature with each other through the same passband sub-channel.

Figure 7:
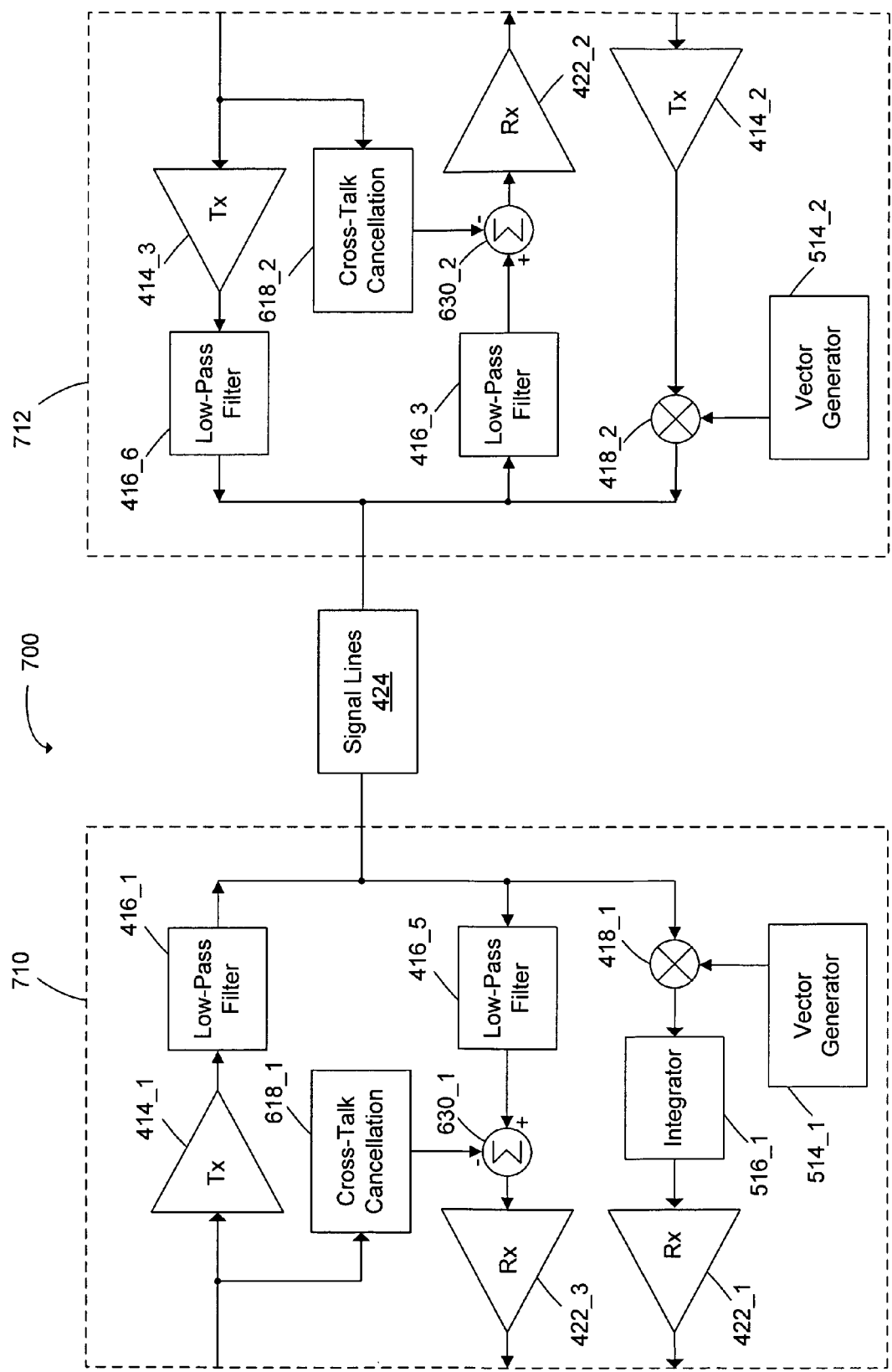
FIG. 7 is a block diagram illustrating an embodiment of a memory system with a simultaneous bi-directional link.

FIG. 7 illustrates an additional embodiment of the simultaneous bi-directional link for communication between a first device 710 and a second device 712. Once again, modulation and demodulation in memory system 700 use the vector signals produced by vector generators 514_1 and 514_2. Note that in some embodiments, low-pass filters 416_2 and 416_4 (FIGS. 4 and 6) are included in the system 700. In some embodiments, the received data signals are passed through an optional bandpass filter (not shown) prior to demodulation. And note that in some embodiments, the first device 710 and the second device 712 may include additional circuitry corresponding to additional passband sub-channels. Further, in some embodiments, two data signals may be transmitted in quadrature with each other through the same passband sub-channel.

Figure 12:
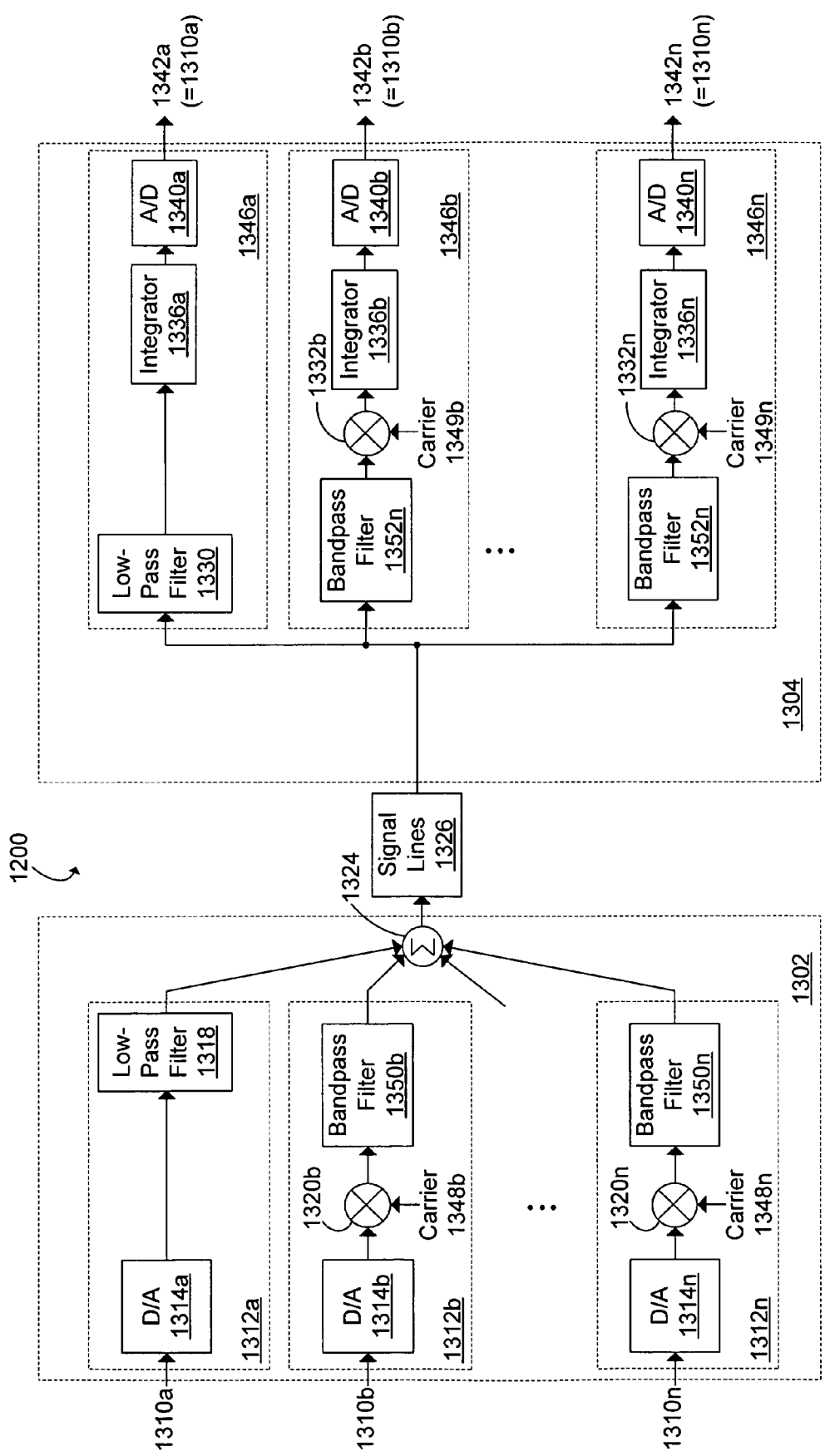
FIG. 12 is block diagram illustrating an embodiment of a memory system with a simultaneous bi-directional link.
Figure 13:
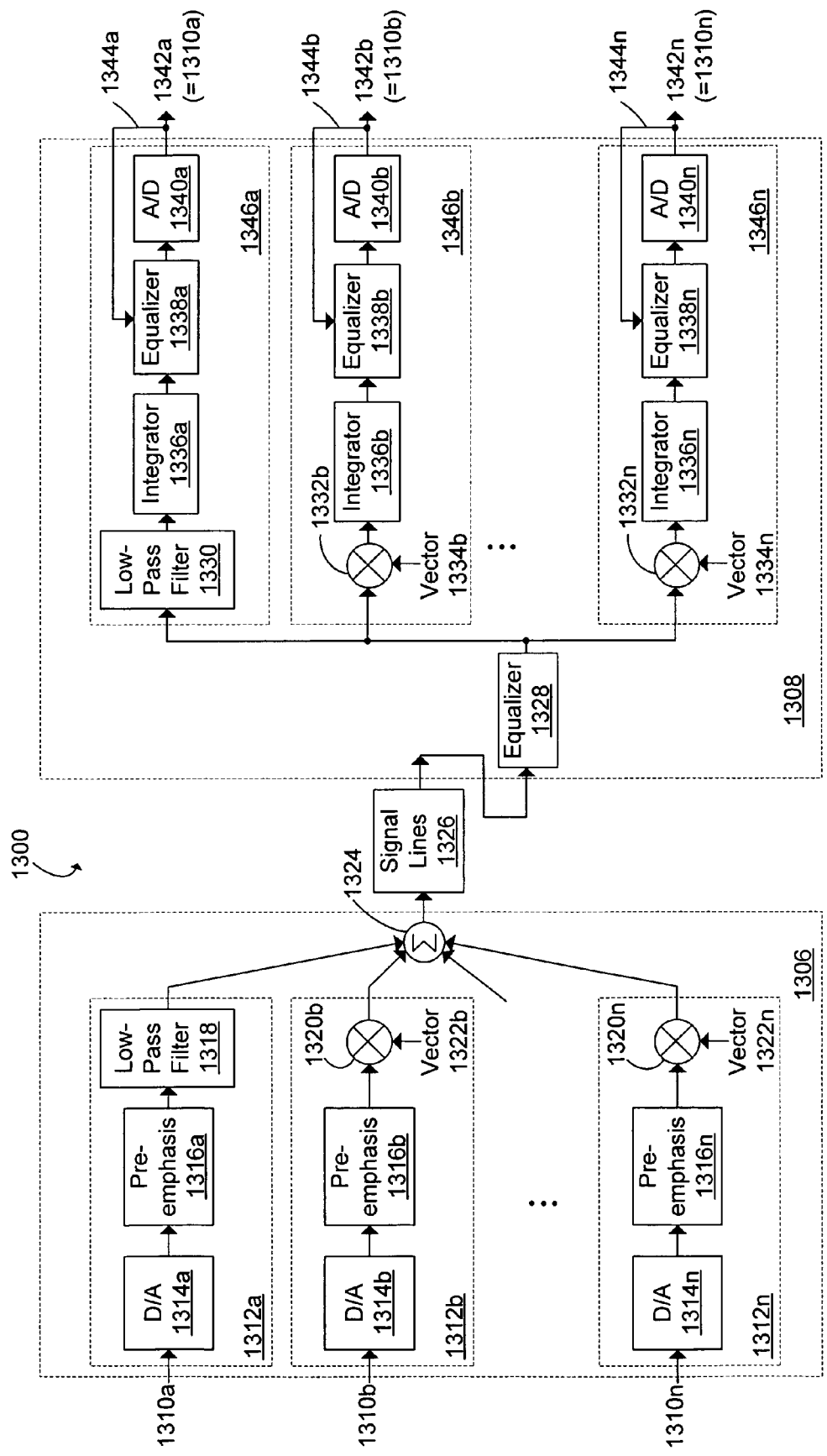
FIG. 13 is block diagram illustrating an embodiment of a memory system with a simultaneous bi-directional link.

FIGS. 4-7 illustrate embodiments of the simultaneous bi-directional link that use multi-tone communication. FIGS. 4 and 6 are also referred to as bit-loading and, as discussed previously, FIGS. 5 and 7 are also referred to as approximate bit-loading. FIGS. 12 and 13 illustrate embodiments corresponding to more general implementations of multi-tone systems having a simultaneous bi-directional link.

FIG. 12 illustrates an embodiment of a discrete multi-tone memory system 1200 for simultaneous bi-directional communication between a first device 1302 and a second device 1304. FIG. 12 illustrates transmission from the first device 1302 and receiving in the second device 1304. For simultaneous bi-directional communication, additional circuitry (not shown) with similar functionality is included in the memory system 1200 for transmission in the second device 1304 and receiving in the first device 1302.

During data transmission from the first device 1302, respective subsets 1310 of the data stream (sometimes herein called data sub-streams) are converted to analog signals in digital-to-analog (D/A) converters 1314. Each sub-channel has a respective data rate less than the data rate of the data stream. In data transmission circuits 1312b through 1312n, the analog signals are modulated in mixer 1320 with a respective sinusoidal carrier signal 1348 to produce a respective passband sub-channel signal. The respective sinusoidal carrier signals 1348, generated by one or more signal generators (not shown), have respective carrier frequencies. The respective sinusoidal carrier signals 1348, also known as harmonic signals, may be sines, cosines or have phases in between sines and cosines. In some embodiments, the mixers 1320 are multipliers. In other embodiments, modulation is achieved using a square-wave signals, each having a respective fundamental frequency. In the frequency domain, the signal spectrums of the respective analog signals are shifted to respective frequency bands centered on the respective carrier frequencies. Each respective passband sub-channel signal is then filtered using bandpass filter 1350 to ensure precise bit-loading, i.e., orthogonal frequency bands. In the data transmission circuit 1312a, corresponding to the baseband sub-channel 364 (FIG. 3), the analog signals are filtered by low-pass filter 1318. The respective sub-channel signals are then combined by a summing or other combining circuit 1324 and transmitted through a set of signal lines 1326. In some embodiments, the set of signal lines 1326 includes one or more signal lines.

During data receiving, in the data receiving circuits 1346b through 1346n, corresponding to the passband sub-channels, signals transmitted through the set of signal lines 1326 are filtered by bandpass filters 1352. The resulting respective sub-channel signals are multiplied in mixers 1332 by respective sinusoidal carrier signals 1349 having respective frequencies and phases provided by sinusoid generators (not shown) to produce respective analog signals. In some embodiments, the mixers 1332 are signal multipliers. The respective analog signals may be integrated in optional integrators 1336 to produce respective integrated analog signals. Conversion of the respective integrated analog signals by analog-to-digital (A/D) converters 1340 produces respective subsets 1342 of the data stream. In the data receiving circuit 1346a, corresponding to the baseband sub-channel 364 (FIG. 3), signals are filtered by low-pass filter 1330, may be integrated by optional integrator 1336a and are converted by analog-to-digital converter 1340a to produce subset 1342a of the data stream. When the memory system 1200 is operating properly, subsets 1342 are substantially the same, and preferably substantially identical, to subsets 1310. In some embodiments, the discrete multi-tone memory system 1200 may have optional pre-emphasis (not shown) in one or more of the data transmission circuits 1312 and/or equalization (not shown) in one or more of the data receiving circuits 1346.

FIG. 13 illustrates an embodiment of a discrete multi-tone memory system 1300 for simultaneous bi-directional communication between a first device 1306 and a second device 1308 that uses approximate bit-loading. FIG. 13 illustrates transmission from the first device 1306 and receiving in the second device 1308. For simultaneous bi-directional communication, additional circuitry (not shown) with similar functionality is included in the memory system 1300 for transmission in the second device 1306 and receiving in the first device 1308.

In the data transmission circuits 1312b through 1312n of the first device 1306, corresponding to the passband sub-channels such as the passband sub-channel 366 (FIG. 3), bandpass filter 1350 may be removed. Therefore, the bandpass filter is not shown in FIG. 13. The analog signals produced by D/A converters 1314b to 1314n are modulated by mixers 1320b to 1320n using vector signals 1322. Each vector signal 1322 has a respective sequence of N elements and is orthogonal to the respective vector signals used to define other sub-channels during the finite time interval corresponding to each respective sequence of N elements. In an exemplary embodiment, each respective vector signal 1322 has a respective sequence of N elements corresponding to a row of a Hadamard matrix of order N, where the number of elements N in a row is an even integer.

Similarly, in the data receiving circuits 1346b through 1346n, corresponding to the passband sub-channels such as the passband sub-channel 366 (FIG. 3), bandpass filter 1352 may be removed and is, therefore, not shown. Demodulation of the signals for each passband is achieved using a respective vector signals 1334. The integrators 1336 in each of the data receiving circuits 1346 (integrator 1336a is optional) integrate the respective sub-channel signals for a length of time (the integration period) corresponding to the aforementioned finite time interval to produce respective integrated sub-channel signals. Each of the integrated sub-channel signals has a data rate that is less than the data rate of the common input signal. In some embodiments, the integrators 1336 are implemented using so-called integrate and dump circuits. In some embodiments, the integrators 1336 are reset after each integration period.

Several alternative embodiments of memory system 1300 are shown in FIG. 13. Pre-emphasis filter 1316 may be included in each of the data transmission circuits 1312 of the first device 1306. In the second device 1308, the common input signal may be equalized with an equalizer 1328. In addition, equalizers 1338 may be placed in one or more of the data receiving circuits 1346. The equalizers 1328 and 1338 may be implemented as feed-forward filters, as decision feedback equalization circuits or as a combination of both.

In an alternative embodiment, the pre-emphasis filters 1316 may be combined into a single pre-emphasis block (not shown), with one or more of the outputs from the D/A converters 1314 as inputs to the pre-emphasis block. In another alternative embodiment, pre-emphasis may be applied to the data stream prior to the D/A conversion of the respective subsets 1310 of the data stream. In an additional embodiment, the pre-emphasis filters 1316 may be combined with the D/A converters 1314.

In an additional embodiment, equalization in the data receiving circuits 1346 may be implemented using the equalizers 1338 but without using the equalizer 1328. Alternatively, equalization may be implemented using the equalizer 1328 without using the equalizers 1338. In an additional embodiment, equalization may be implemented using equalizers 1338 with both the respective sub-channel signals and the digital outputs 1342 as inputs, using optional feedback 1344. In an additional embodiment equalization may be implemented using a single equalizer (not shown) with one or more of the respective sub-channel signals and, optionally, one or more of the digital outputs 1342 as inputs.

The characteristics of the respective vector signals used in the memory system 500, the memory system 700 and the memory system 1300 are described below. Mathematically, each of the respective subsets of the data stream 1310 may be represented by a train of pulses $$d_i(t) = \sum_{n=-\infty}^{\infty} d_i[n] \cdot g(t - nTsym),$$

where $d_i[n]$ are the samples of one of the respective subsets 1310 of the data stream arriving once every bit time (Tsym) seconds and g(t) is a function having any suitable shape, for example, a rectangular pulse of duration Tsym. Each of the respective vector signals 1322 and 1334 may be represented by $$c_i(t) = \sum_{n=-\infty}^{\infty} \sum_{m=0}^{N-1} H_i[m] \cdot p(t - nTsym - mTchip),$$

where $H_i[m]$ is an element in one of the sequences with the number of elements N and p(t) is a rectangular pulse of unity height and duration Tchip, where Tchip is the bit time (sometimes called the chip time) of the respective vector signals 1322 and 1334. Note that each of the respective vector signals 1322 and 1334 cyclically repeats with a period Tsym. Also note that Tsym may be an integer multiple of Tchip. In an exemplary embodiment, Tsym equals N times Tchip.

In some embodiments, the respective vectors signals 1322 and 1334 are analog signals based on the respective sequences. In alternative embodiments, multiplication in the data transmission circuits 1312 and the data receiving circuits 1346 use a digital representation of the respective vectors signals 1322 and 1334.

In another embodiment, an inverse of the data rate of the data sub-streams may be an integer multiple of the bit time, i.e., Tsym, for each of the respective subsets 1310 of the data stream. The integer multiple may be an even integer. In an exemplary embodiment, the integer multiple is N.

In yet another embodiment, the finite time over which the respective vectors 1322 and 1334 are orthogonal to other respective vectors 1322 and 1334, and the finite time that the integrators 1336 integrate the respective sub-channel signals, may correspond to, or be substantially equal to N times the bit time, i.e., Tchip, for the respective vector signals 1322 and 1334. In addition, the inverse of the data rate of the common input signal (received by second device 1308) may be an integer multiple of the bit time of the respective vector signals 1322 and 1334. The integer multiple may be an even integer. In an exemplary embodiment, the integer multiple is N.

Each element of the sequences of N elements may be binary numbers and each element of the respective vector signals 1322 and 1334 may correspond to one of two voltage levels. In an exemplary embodiment, each of the sequences corresponds to a row of a Hadamard matrix of order N, where the number of elements N in a row is an even integer. The N value may be chosen based on the overall latency and circuit complexity, i.e., the number of parallel data transmission 1312 and data receiving 1346 circuits. A binary Hadamard matrix of order 8 (i.e., N equal to 8) represents a reasonable tradeoff between latency, circuit complexity, the overlap 1114 (FIG. 11) of the frequency bands in the spectrum 1100 (FIG. 11) and the data rate of the respective subsets 1310 of the data stream (and, thus, the speed of D/A converters 1314 and A/D converters 1340). In this exemplary embodiment, the integrators 1336 may integrate the respective sub-channel signals for the finite time, corresponding to 8 times Tchip, before transferring the respective integrated sub-channel signals to a next circuit.

Some embodiments may use vector signals 1322 and 1334 with sequences of non-binary elements, or sequences of elements having more than two voltage levels. This may, however, make the multiplication of the respective analog sub-stream signals and the respective vector signals 1322, and the common input signal and the respective vector signals 1334, more complex. As an example, each element of the sequences may be ternary numbers and each element of the respective vector signals 1322 and 1334 may correspond to one of three voltage levels. Other potentially suitable sequences include binary pseudorandom sequences such as maximal length sequences (m-sequences), Gold codes and Kasami sequences.

In some embodiments, a timing recovery mechanism (not shown) in the second device 1308 may determine synchronization information from the common input signal and couple the synchronization information to at least one of the integrators 1336 and at least one of the A/D converters 1340. Typically, the synchronization information would be used to control each of the integrators 1336 and each the A/D converters 1340. The synchronization information from the timing recovery mechanism may also adjust a phase of at least one of the vector generators (see 514_2, FIG. 5) that generates the respective vector signals 1334, thereby allowing the phase of one or more of the respective vector signals, such as vector signal 1334b, to be adjusted. In some embodiments, the signal generators may be implemented as a single signal generator. In yet another embodiment, the data receiving circuits 1346 may receive synchronization information from the timing recovery mechanism based on an optional clock input signal (not shown) from an external source and the common input signal.

In some embodiments, a plurality of timing recovery mechanisms (not shown) may be included in the data receiving circuits 1346 and may determine synchronization information from the respective sub-channel signals and couple the synchronization information to the respective integrators 1336, A/D converters 1340 and/or signal generators (not shown, but which generate vectors 1334). Coupling the synchronization information to the signal generators allows the phase of the respective vectors to be adjusted. In some embodiments, the plurality of timing recovery mechanisms may determine synchronization information from the respective integrated sub-channel signals.

Referring back to FIG. 1, the control logic 210 may allocate and/or adjust one or more sub-channels in one or more data transmission/receiving circuits 218 and 226. In some embodiments, one or more low pass-filters and/or one or more bandpass filters in one or more data transmission/receiving circuits may be adjustable. Since the respective sub-channel in the various embodiments is defined by a respective low-pass filter corner frequency, a respective bandpass filter bandwidth, a respective carrier frequency, a respective square-wave fundamental frequency and/or a respective vector signal corresponding to the respective sequence, in some embodiments the control logic 210 may adjust one or more of these parameters. Adjustment of one or more of these parameters allows the control logic 210 to make coarse and/or fine adjustments in the band of frequencies used for data transmission in the respective direction. In addition, as discussed previously, the control logic 210 may also allocate one or more entire sub-channels based on the predetermined unidirectional data rate in a respective direction.

In one or more of the embodiments of the simultaneous bi-directional link, data transmission circuits, such as data transmission circuits 1312 (FIG. 13), and data receiving circuits, such as data receiving circuits 1346 (FIG. 13), may modulate and demodulate the signals transmitted and received, respectively. Modulation and demodulation may be implemented using bit-to-symbol and symbol-to-bit coding, respectively. Bit-to-symbol coding is also referred to as modulation coding. Symbol-to-bit coding is also referred to as demodulation coding. Sometimes both are referred to as modulation coding. In bit-to-symbol coding, one or more data bits are mapped together to a multi-level symbol in the respective subsets 1310 (FIG. 13) of the data stream. For example, a group of two bits can be mapped to one of four different amplitudes of a voltage pulse signal, one of four different phases of a sinusoid or a combination of one of two different amplitudes of a sinusoid and one of two different phases of the same sinusoid. Symbol-to-bit coding is the inverse procedure. The coding used may be different for one or more sub-channels in one or more of the data transmission/receiving circuits 218 and 226. The control logic 210 may adjust the coding used in the respective sub-channel based on one or more characteristics of the set of signal lines 220, such as a signal-to-noise ratio, and/or the predetermined unidirectional data rate.

Figure 8A:
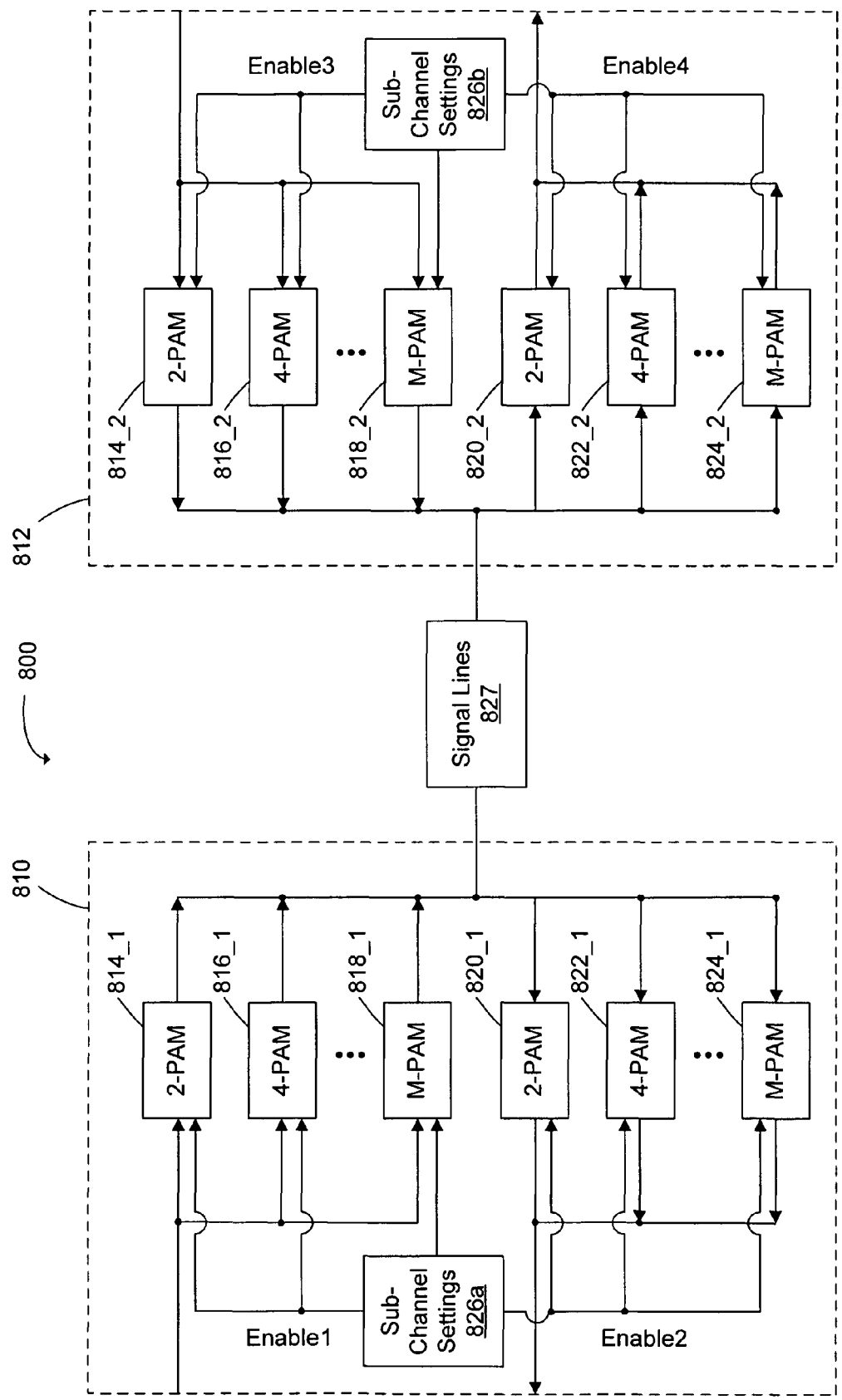
FIG. 8a is a block diagram illustrating modulation in an embodiment of a memory system with a simultaneous bi-directional link.
Figure 8B:
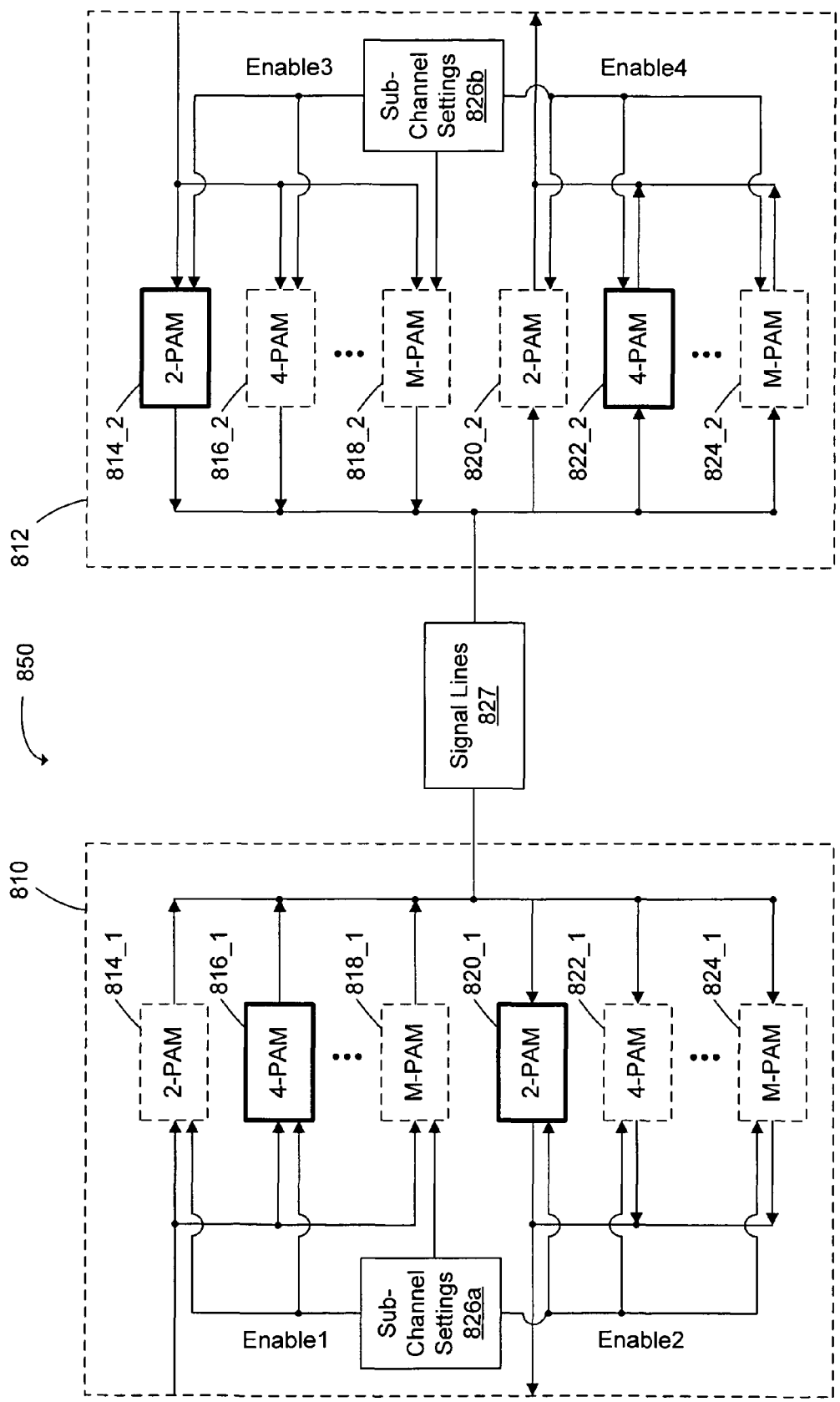
FIG. 8b is a block diagram illustrating modulation in an embodiment of a memory system with a simultaneous bi-directional link.

Bit-to-symbol coding and symbol-to-bit coding are illustrated in FIGS. 8 and 9. In FIG. 8a, a memory system 800 has a first device 810 communicating with a second device 812 using a set of signal lines 827. In some embodiments, the set of signal lines 827 has one or more signal lines. Control logic, such as the control logic 210 (FIG. 1), selects sub-channel settings 826. The sub-channel settings 826 enable at least one of the bit-to-symbol coding circuits 814, 816 and 818 during transmission and/or at least one of the symbol-to-bit coding circuits 820, 822 and 824 during receiving.

Figure 9A:
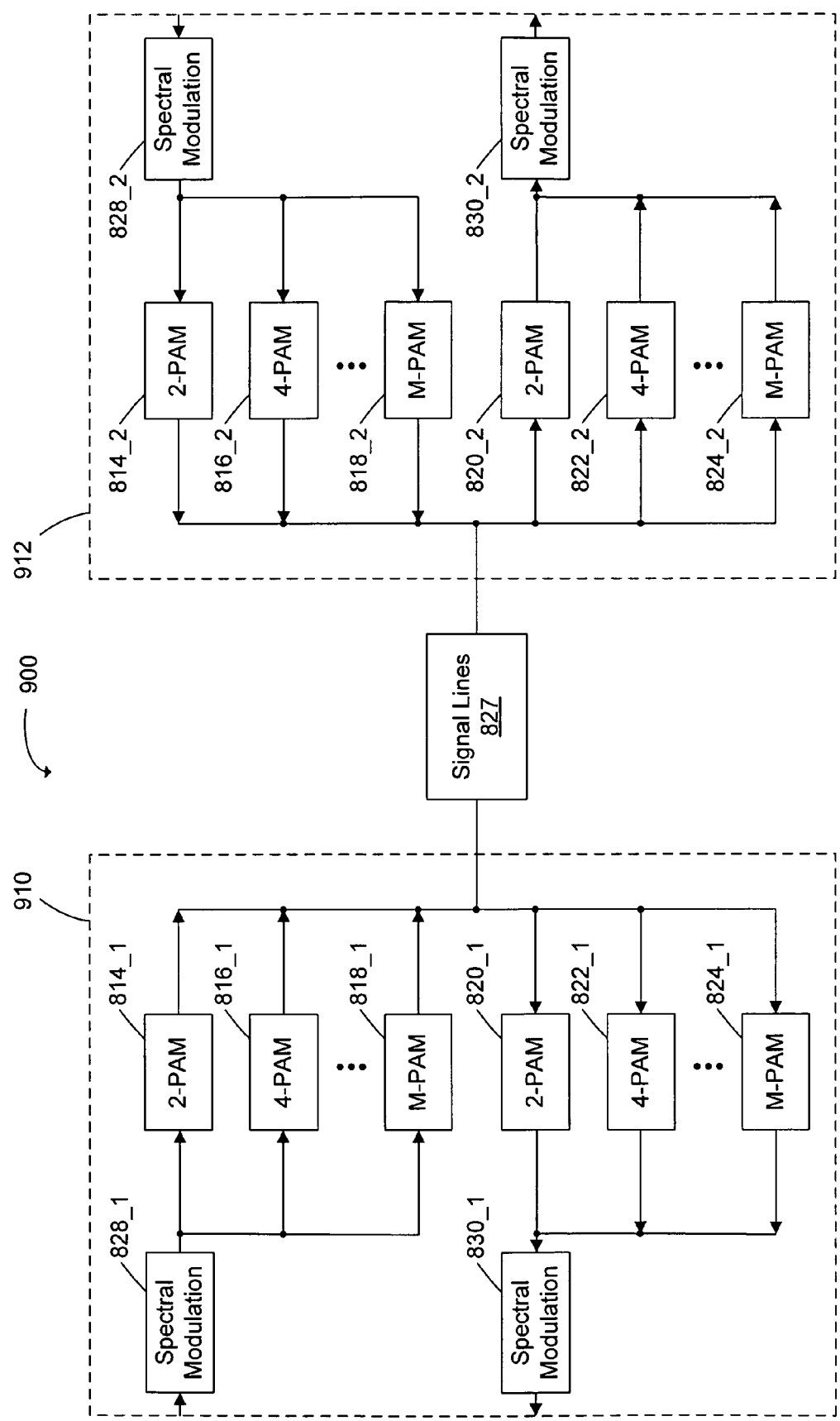
FIG. 9a is a block diagram illustrating modulation in an embodiment of a memory system with a simultaneous bi-directional link.

In FIG. 9a, a memory system 900 has a first device 910 communicating with a second device 912 using the set of signal lines 827. The first device 910 and the second device 912 also include spectral modulation 828 during data transmission and spectral modulation 830 during data receiving. Spectral modulation 828 and 830 corresponding to one of the multi-tone techniques described previously for shifting signals into the band of frequencies corresponding to one or more passbands, such as shown in FIGS. 12 and 13.

The bit-to-symbol coding circuits 814, 816 and 818 and symbol-to-bit coding circuits 820, 822 and 824, if used in a baseband sub-channel, may include two or more level pulse amplitude modulation (PAM), such as two-level pulse amplitude modulation (2PAM), four-level pulse amplitude modulation (4PAM), eight-level pulse amplitude modulation (8PAM) and sixteen-level pulse amplitude modulation (16PAM). Suitable coding in one or more passband sub-channels includes 2 or more level pulse amplitude modulation (PAM), also referred to as on-off keying, such as two-level pulse amplitude modulation (2PAM), four-level pulse amplitude modulation (4PAM), eight-level pulse amplitude modulation (8PAM) and sixteen-level pulse amplitude modulation (16PAM). Suitable coding in one or more passband sub-channels also includes two or more level quadrature amplitude modulation (QAM).

FIGS. 10a-e illustrate the frequency bands in a series of embodiments of a memory system, such as a DRAM, that may be dynamically selected by the control logic 210 (FIG. 1). Alternatively, such asymmetric configurations of sub-channels and modulation coding may be fixed, thereby simplifying the memory system and reducing the cost.

Figure 10A:
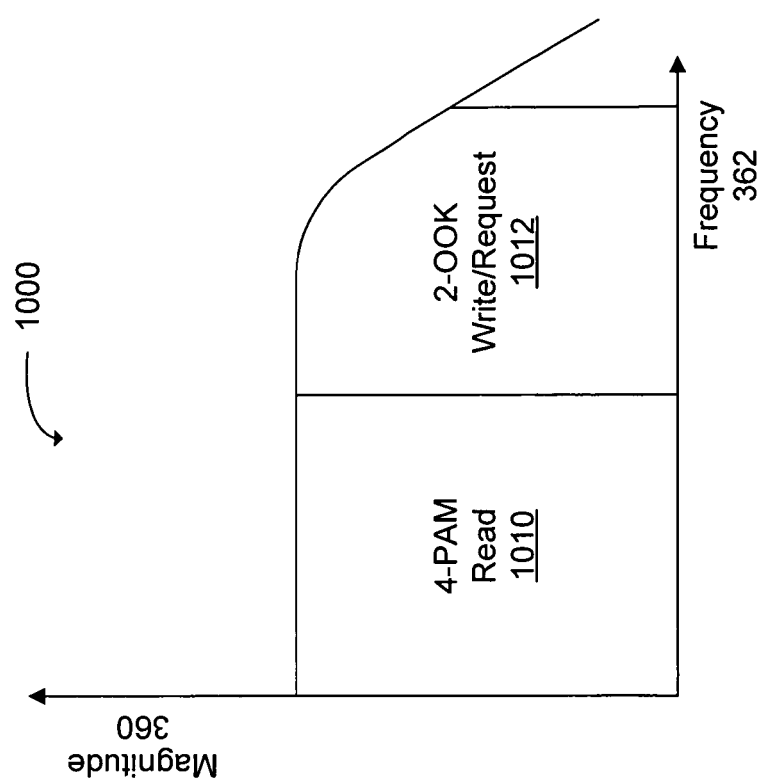
FIG. 10a is a schematic diagram of the frequency bands of two sub-channels in an embodiment of a memory system having a simultaneous bi-directional link.

In FIG. 10a, a memory system 1000 configured for simultaneous bi-directional data transmission has a baseband sub-channel 1010 for data transmission from the memory device 212 (FIG. 1) to the controller 208 (FIG. 1), i.e., reading of previously stored data. The memory system 1000 corresponds to the memory system 450 in FIG. 4b. The baseband sub-channel 1010 uses 4-PAM modulation coding. The memory system 1000 also has a passband sub-channel 1012 for data transmission from the controller 208 (FIG. 1) to the memory device 212 (FIG. 1), i.e., data write and/or control commands (request). The passband sub-channel 1012 uses 2-OOK (two-level on-off keying) modulation coding.

Figure 9B:
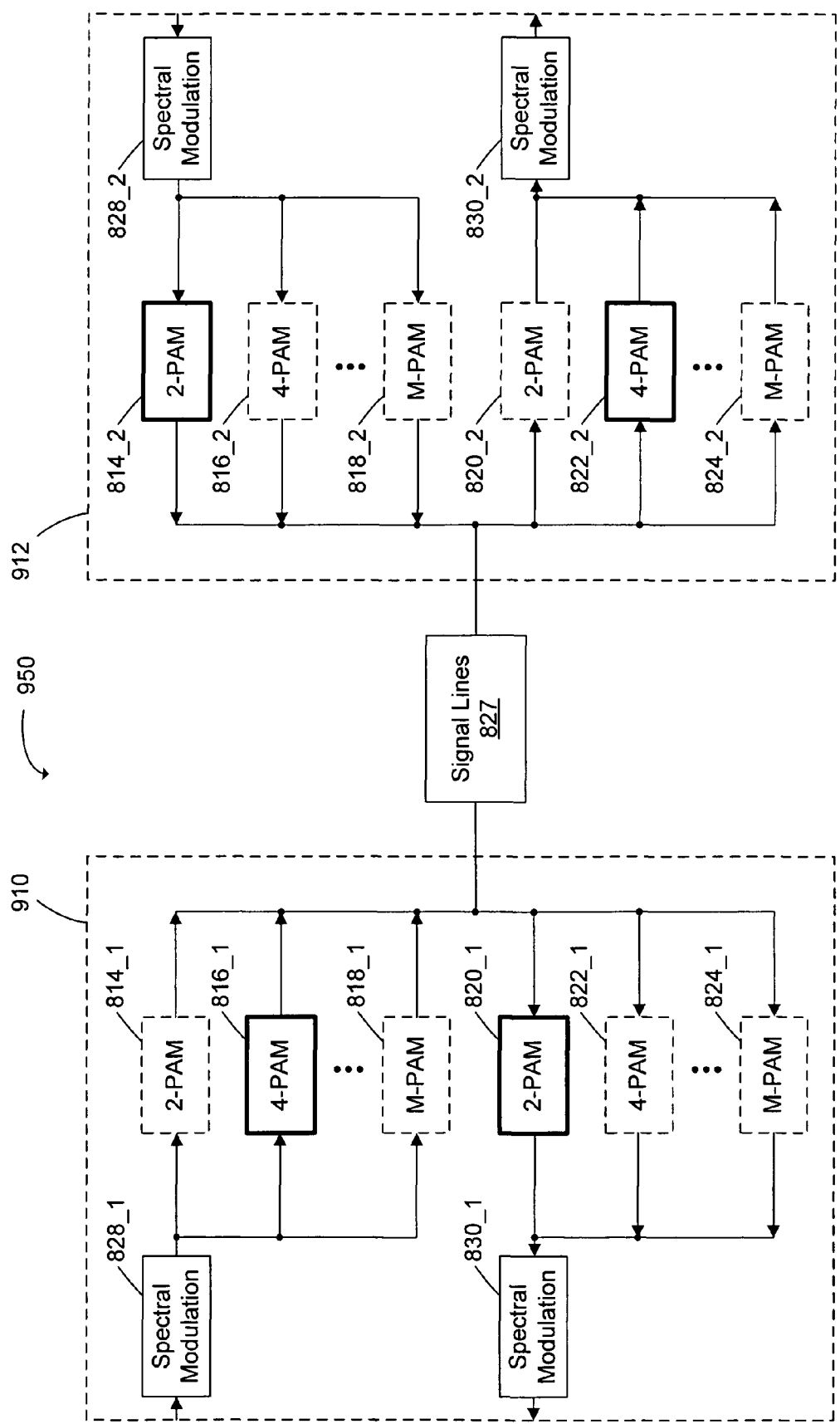
FIG. 9b is a block diagram illustrating modulation in an embodiment of a memory system with a simultaneous bi-directional link.

This asymmetric modulation code configuration is also illustrated in memory system 850 (FIG. 8b) and memory system 950 (FIG. 9b). The sub-channel settings 826a may dynamically select 4-PAM 816_1 and 2-PAM 820_1, and the sub-channel settings 826b may dynamically select 4-PAM 814_2 and 2-PAM 822_2. As noted above, alternatively such an asymmetric configuration may be fixed. In the other embodiments illustrated in FIGS. 10b-10e below, the sub-channel settings 826 may dynamically select the appropriate modulation 814, 816, 820, 822 or the asymmetric modulation configuration may be fixed.

Figure 10B:
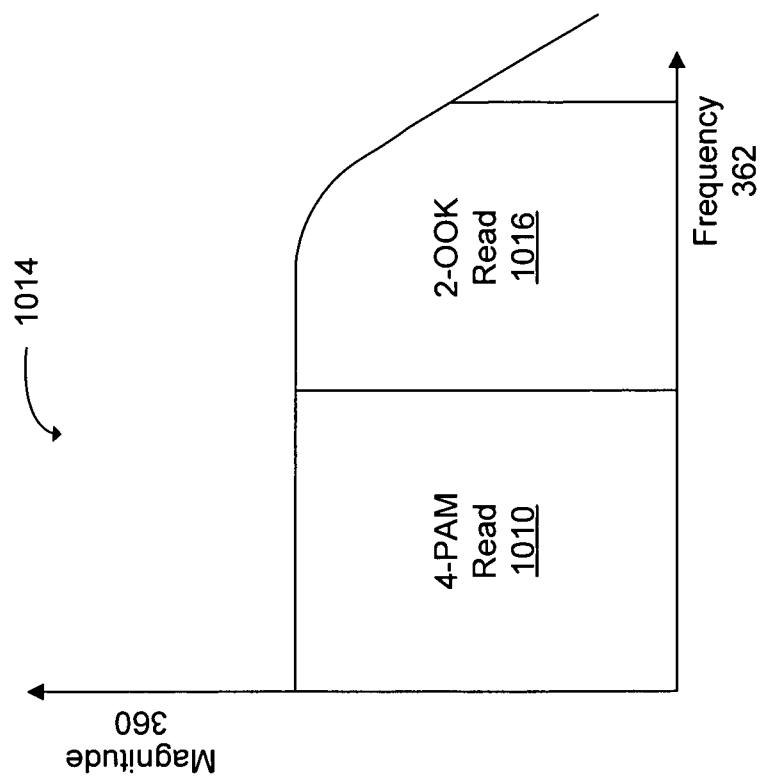
FIG. 10b is a schematic diagram of the frequency bands of two sub-channels in an embodiment of a memory system with a unidirectional link.

In FIG. 10b, a memory system 1014 has been configured for unidirectional data transmission from the memory device 212 (FIG. 1) to the controller 208 (FIG. 1). A passband sub-channel 1016 has been configured for data transmission from the memory device 212 (FIG. 1) to the controller 208 (FIG. 1), i.e., reading of previously stored data. The passband sub-channel 1016 uses 2-OOK modulation coding.

Figure 10C:
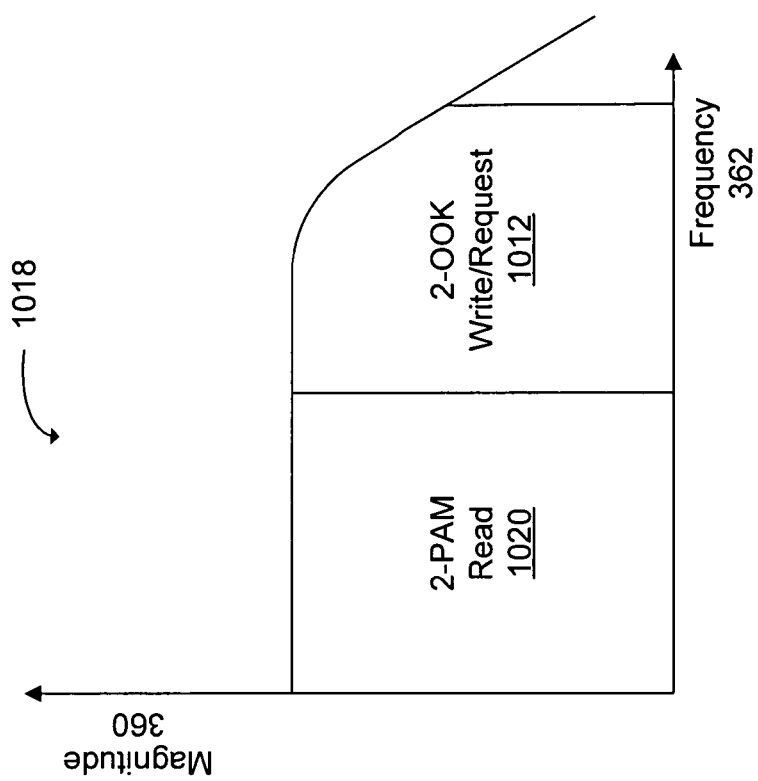
FIG. 10c is a schematic diagram of the frequency bands of two sub-channels in an embodiment of a memory system with a simultaneous bi-directional link.

In FIG. 10c, a memory system 1018 has been configured for simultaneous bi-directional data transmission. A baseband sub-channel 1020 for data transmission from the memory device 212 (FIG. 1) to the controller 208 (FIG. 1), i.e., reading of previously stored data, uses 2-PAM modulation coding, while a passband sub-channel 1016 for data transmission to the memory device (e.g., for writing data to the memory device) uses 2-OOK modulation coding. The memory system 1018 may be useful in a power conserving mode of operation.

Figure 10D:
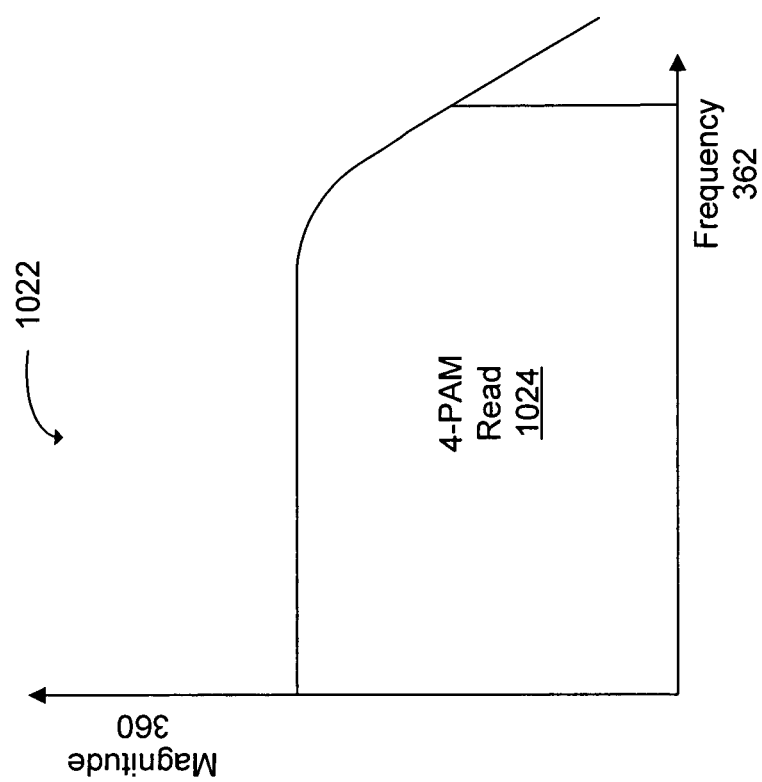
FIG. 10d is a schematic diagram of the frequency band of a sub-channel in an embodiment of a memory system with a unidirectional link.
Figure 10E:
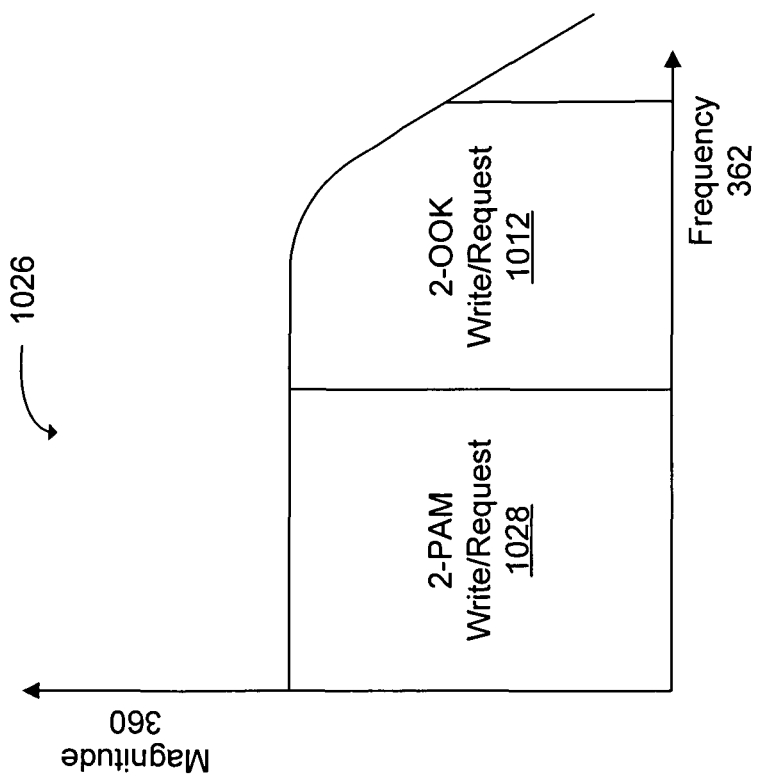
FIG. 10e is a schematic diagram of the frequency bands of two sub-channels in an embodiment of a memory system with a unidirectional link.

In FIG. 10d, a memory system 1022 has been configured for unidirectional data transmission. A baseband sub-channel 1024 for data transmission from the memory device 212 (FIG. 1) to the controller 208 (FIG. 1), i.e., reading of previously stored data, using 4-PAM modulation coding, has been allocated a maximum band of frequencies.

FIG. 1e, a memory system 1026 has been configured for unidirectional data transmission from the controller 208 (FIG. 1) to the memory device 212 (FIG. 1). A baseband sub-channel 1028 has been configured for data transmission from the controller 208 (FIG. 1) to the memory device 212 (FIG. 1), i.e., data write and/or control commands (request). The baseband sub-channel 1028 uses 2-PAM modulation coding. A passband sub-channel 1016 for data transmission to the memory device (e.g., for writing data to the memory device) uses 2-OOK modulation coding.

Figure 14:
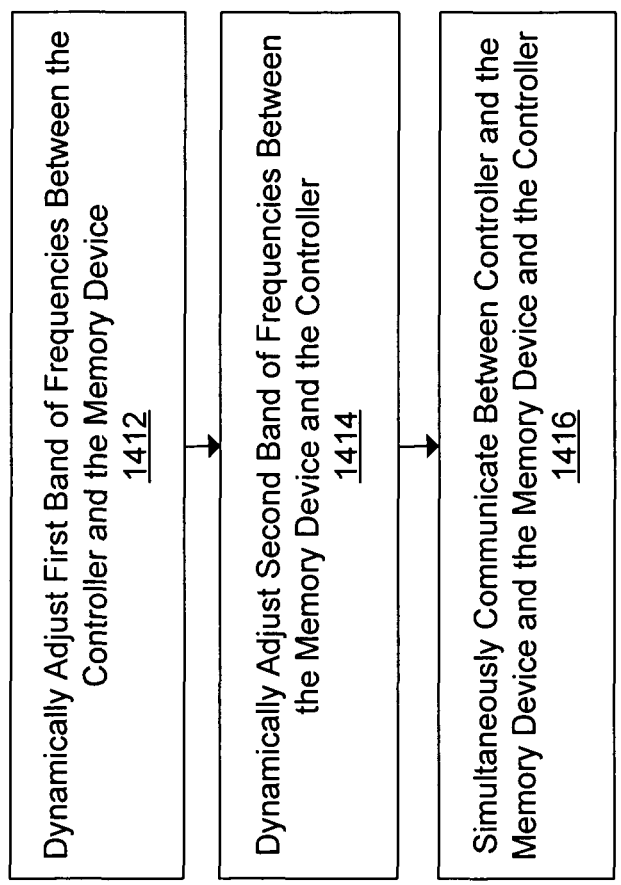
FIG. 14 is a flow diagram illustrating a method of operation of an embodiment of a simultaneous bi-directional link.

FIG. 14 is a flow diagram illustrating an embodiment of a method or process for the simultaneous bi-directional link. A first band of frequencies 368 (FIG. 3) between the controller 208 (FIG. 1) and the memory device 212 (FIG. 1) is adjusted 1412. In addition, a second band of frequencies 370 (FIG. 3)

between the memory device 212 (FIG. 1) and the controller 208 (FIG. 1) is adjusted 1414. After the frequency bands have been adjusted, data is simultaneously communicated between the controller 208 (FIG. 1) and the memory device 212 (FIG. 1) and the memory device 212 (FIG. 1) and the controller 208 (FIG. 1) 1416. It may be noted that the frequency band adjustment tasks 1412 and 1414 may be performed in any order, or simultaneously.

The simultaneous bi-directional link and method are well-suited for use in the interface between semiconductor chips or dies, such as electronic interconnects. In particular, the simultaneous bi-directional link and method are well-suited for use in improving communication between semiconductor chips on the same printed circuit board (PCB) or between semiconductor chips on different printed circuit boards that are connected through a backplane or a coaxial cable at data rates exceeding 1, 2 or 5 Gbps, depending on the embodiment. The simultaneous bi-directional link and method are also well-suited for use in improving communication between a memory controller chip and a dynamic random access memory (DRAM) chip. The DRAM chip may be either on the same printed circuit board as the controller or embedded in a memory module. In addition, the simultaneous bi-directional link and method are well-suited for use in improving communication at data rates exceeding 1, 2 or 5 Gbps, depending on the embodiment, between a buffer chip and a DRAM chip, both of which are on the same memory module. The apparatus and methods described herein may also be applied to other memory technologies, such as static random access memory (SRAM) and electrically erasable programmable read-only memory (EEPROM).

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A memory system, comprising:
   a controller;
   a memory device; and
   a set of signal lines, coupled to the controller and the memory device, wherein, on each of the signal lines, the controller is to communicate to the memory device using a first band of frequencies while the memory device is communicating to the controller using a second band of frequencies, and wherein the controller is configured to dynamically adjust the first band of frequencies based on a predetermined data rate from the controller to the memory device and to dynamically adjust the second band of frequencies based on a predetermined data rate from the memory device to the controller;
   wherein the controller is configured to simultaneously read data from the memory device using the first band of frequencies and write data to the memory device using the second band of frequencies.

2. The memory system of claim 1, wherein the controller includes control logic to dynamically adjust the first band of frequencies based on the predetermined data rate from the controller to the memory device and to dynamically adjust the second band of frequencies based on the predetermined data rate from the memory device to the controller.

3. The memory system of claim 1, wherein the predetermined data rate from the controller to the memory device is greater than 1 Gbps.

4. The memory system of claim 1, wherein the predetermined data rate from the memory device to the controller is greater than 1 Gbps.

5. The memory system of claim 1, wherein the set of signal lines has a length less than 1 m.

6. The memory system of claim 1, wherein the set of signal lines includes at least a passband sub-channel corresponding to the second band of frequencies and a baseband sub-channel corresponding to the first band of frequencies.

7. The memory system of claim 6, wherein in one mode of operation the controller is configured to allocate a substantially zero band of frequencies to the first band of frequencies and a maximum band of frequencies to the second band of frequencies in order to transfer data from the memory device to the controller at a maximum rate.

8. The memory system of claim 1, wherein in at least one mode of operation the set of signal lines uses multi-tone communication over a plurality of sub-channels including at least a baseband sub-channel and a passband sub-channel, wherein a first device selected from the set consisting of the controller and the memory device is configured to transmit a data stream in the plurality of sub-channels including at least the baseband sub-channel and the passband sub-channel, and wherein each sub-channel communicates a subset of the data stream, the subset of the data stream having a symbol rate less than a symbol rate of the data stream.

9. The memory system of claim 8, wherein the plurality of sub-channels comprise approximate orthogonal frequency bands, wherein each respective frequency band is defined at least in part by a respective low-pass filter and a respective frequency band corresponding to the passband sub-channel is further defined by a respective vector that frequency shifts signals into a range of frequencies corresponding to the passband sub-channel, and wherein the respective vector corresponds to a respective sequence of N elements, the respective vector is substantially orthogonal to respective vectors used to define other sub-bands, and the respective vectors are substantially orthogonal during a finite time interval corresponding to each sequence of N elements.

10. The memory system of claim 9, wherein receive circuits in a second device selected from the set comprising the controller and the memory device include an integrator and the integrator integrates signals in a respective sub-channel for substantially the finite time interval.

11. The memory system of claim 9, wherein each respective sub-channel corresponds to at least one frequency band that at least partially overlaps a frequency band for at least one other respective sub-channel.

12. The memory system of claim 9, wherein each respective sub-channel corresponds to a group of frequency bands at least one of which overlaps a frequency band for at least one other respective sub-channel.

13. The memory system of claim 8, wherein signals in the baseband sub-channel are modulated using a first modulation code and signals in the passband sub-channel are modulated using a second modulation code.

14. The memory system of claim 13, wherein the first modulation code is four-level pulse amplitude modulation (4-PAM) and the second modulation code is two-level, on-off keying (2-OOK).

15. The memory system of claim 13, wherein the first modulation code and the second modulation code are selected from the group consisting of two-level pulse amplitude modulation (2-PAM), four-level pulse amplitude modulation (4-PAM), eight-level pulse amplitude modulation (8-PAM), sixteen-level pulse amplitude modulation (16-PAM), two-level on-off keying (2-OOK), four-level pulse on-off keying (4-OOK), eight-level on-off keying (8-OOK) and sixteen-level on-off keying (16-OOK).

16. The memory system of claim 8, further comprising a control channel for communicating to the memory device adjustments to the plurality of sub-channels.

17. The memory system of claim 1, wherein the set of signal lines uses multi-tone communication over N sub-channels and the controller determines how many of the N sub-channels are used for communication from the controller to the memory device and how many of the N sub-channels are used for communication from the memory device to the controller.

18. The memory system of claim 1, wherein the controller is configured to dynamically adjust at least one circuit in the controller and the memory device so as to adjust the first band of frequencies and the second band of frequencies.

19. The memory system of claim 18, wherein adjustment of the at least one circuit modifies at least one parameter selected from the group consisting of a respective low-pass corner frequency, a respective frequency band corresponding to a bandpass filter and a respective frequency of a sinusoidal signal.

20. A memory system, comprising:
a controller;
a memory device; and
a set of signal lines, coupled to the controller and the memory device, wherein, on each of the signal lines, the controller is to communicate to the memory device using a first band of frequencies while the memory device is communicating to the controller using a second band of frequencies, the set of signal lines including a baseband sub-channel and a passband sub-channel;
wherein the controller is configured to dynamically adjust each of the first band of frequencies and the second band of frequencies to a value between zero and a maximum band of frequencies based on a predetermined unidirectional data rate that is greater than 1 Gbps, the unidirectional data rate for communicating a unidirectional data streams
wherein the controller is configured to simultaneously read data from the memory device using the first band of frequencies and write data to the memory device using the second band of frequencies.

21. The memory system of claim 20, wherein the controller includes control logic to dynamically adjust the first band of frequencies and the second band of frequencies based on the predetermined unidirectional data rate.

22. The memory system of claim 20, wherein the baseband sub-channel corresponds to the first band of frequencies and is used for communication both from the controller to the memory device and from the memory device to the controller.

23. The memory system of claim 20, wherein the controller and the memory device include cross-talk reduction circuitry configured to reduce cross-talk between transmit and receive circuits associated with the baseband sub-channel.

24. The memory system of claim 20, wherein the baseband sub-channel is defined by a first low-pass filter, and the passband sub-channel is defined by a second low-pass filter, a bandpass filter and a sinusoidal signal that frequency shifts signals into a range of frequencies corresponding to the passband sub-channel.

25. The memory system of claim 20, wherein a receive circuit in a device selected from the set consisting of the controller and the memory device includes an integrator and the integrator integrates signals in the passband sub-channel for substantially the finite time interval.

26. The memory system of claim 20, wherein the passband sub-channel corresponds to at least one frequency band that at least partially overlaps a frequency band for at least another sub-channel.

27. The memory system of claim 20, wherein the passband sub-channel corresponds to a group of frequency bands at least one of which overlaps a frequency band for at least another sub-channel.

28. The memory system of claim 20, further comprising one or more additional passband sub-channels.

29. The memory system of claim 20, wherein the passband sub-channel corresponds to the second band of frequencies and the baseband sub-channel corresponds to the first band of frequencies, and signals in the baseband sub-channel are modulated using four-level pulse amplitude modulation (4-PAM) and signals in the passband sub-channel are modulated using two-level, on-off keying (2-OOK).

30. The memory system of claim 20, wherein the passband sub-channel corresponds to the second band of frequencies and the baseband sub-channel corresponds to the first band of frequencies, and signals in the baseband sub-channel are modulated using two-level pulse amplitude modulation (2-PAM) and signals in the passband sub-channel are modulated using two-level, on-off keying (2-OOK).

31. The memory system of claim 20, wherein the passband sub-channel corresponds to the second band of frequencies and the baseband sub-channel corresponds to the first band of frequencies, and in at least one mode of operation the second band of frequencies is zero, the first band of frequencies is the maximum band of frequencies and signals in the baseband sub-channel are modulated using four-level pulse amplitude modulation (4-PAM).

32. The memory system of claim 20, further comprising a control channel for communicating to the memory device adjustments to the baseband sub-channel and the passband sub-channel.

33. The memory system of claim 20, wherein the set of signal lines uses multi-tone communication over N sub-channels and the controller determines how many of the N sub-channels are used for communication from the controller to the memory device and how many of the N sub-channels are used for communication from the memory device to the controller.

34. The memory system of claim 20, wherein the controller is configured to dynamically adjust at least one circuit in the controller and the memory device so as to adjust the first band of frequencies and the second band of frequencies.

35. The memory system of claim 34, wherein adjustment of the at least one circuit modifies at least one parameter selected from the group consisting of a respective low-pass corner frequency, a respective frequency band corresponding to bandpass filter and a respective frequency of a sinusoidal signal.

36. A method of communication in a memory system having a controller and a memory device coupled by a set of signal lines, comprising:
adjusting a first band of frequencies for communicating from the controller to the memory device based on a predetermined data rate from the controller to the memory device;
adjusting a second band of frequencies for communicating from the memory device to the controller based on a predetermined data rate from the memory device to the controller;

on each of the signal lines, simultaneously communicating data from the controller to the memory device and from the memory device to the controller; and simultaneously reading data from the memory device using the first band of frequencies and writing data to the memory device using the second band of frequencies.

37. A memory system, comprising:

a control means;

a memory means; and a communication means for simultaneously communicating from the control means to the memory means using a first band of frequencies and from the memory means to the control means using a second band of frequencies, wherein the control means includes a configuration means for dynamically adjusting the first band of frequencies based on a predetermined data rate from the control means to the memory means and for dynamically adjusting the second band of frequencies based on a predetermined data rate from the memory means to the control means;

wherein the control means is configured to simultaneously read data from the memory means using the first band of frequencies and write data to the memory means using the second band of frequencies.

* * * * *